United States Patent [19]
Moshier et al.

[11] Patent Number: 5,533,343
[45] Date of Patent: Jul. 9, 1996

[54] FREEZING SYSTEM

[75] Inventors: Mark W. Moshier, Fayetteville, Ark.; John C. Haley, Pittsburg, Mo.; Bobby Z. Haley, Fayetteville; Stanley B. Andrews, Springdale, both of Ark.

[73] Assignee: Tyson Holding Company, Springdale, Ark.

[21] Appl. No.: 309,263

[22] Filed: Sep. 20, 1994

Related U.S. Application Data

[63] Continuation of Ser. No. 271,497, Jul. 7, 1994.

[51] Int. Cl.[6] .............................. F25D 13/06; F25D 17/02; F25D 25/04
[52] U.S. Cl. .................... 62/63; 62/64; 62/374; 62/375; 62/380
[58] Field of Search ........................ 62/63, 64, 374, 62/375, 380, 341

[56] References Cited

U.S. PATENT DOCUMENTS

| | | | |
|---|---|---|---|
| 1,773,079 | 8/1930 | Birdseye | 62/341 |
| 1,773,081 | 8/1930 | Birdseye | 62/341 |
| 1,887,127 | 11/1932 | Hall | 62/341 |
| 1,932,887 | 10/1933 | Giger | 62/341 |
| 1,939,334 | 12/1933 | Burke | 62/341 |
| 2,324,517 | 7/1943 | King | 62/380 |
| 3,096,627 | 7/1963 | Morrison | 62/380 X |
| 3,296,812 | 1/1967 | Cloudy | 62/341 X |
| 3,300,994 | 1/1967 | Bagge-Lund | 62/341 X |
| 3,757,852 | 9/1973 | Allinger | 62/372 X |
| 3,791,162 | 2/1974 | Baker | 62/341 |
| 3,872,681 | 3/1975 | Bierley et al. | 62/63 |
| 4,107,937 | 8/1978 | Chmiel | 62/64 |
| 4,325,221 | 4/1982 | Grewar | 62/63 |
| 4,534,183 | 8/1985 | Hashimoto et al. | 62/374 |
| 5,199,279 | 4/1993 | Reynolds | 62/346 |
| 5,352,472 | 10/1994 | Lucke | 62/341 X |

*Primary Examiner*—Christopher Kilner
*Attorney, Agent, or Firm*—Dougherty, Hessin, Beavers & Gilbert

[57] ABSTRACT

A method of freezing a product, a frozen product produced thereby, and a freezing apparatus useful for performing the inventive method. The inventive method comprises the step of compressing a product to be frozen between a cooled first contacting surface and a cooled second contacting surface for a time effective for at least partially freezing the product. The inventive freezing apparatus preferably comprises: a first plate belt comprising a series of first belt freezing plates, each first belt plate having a contacting surface; a second plate belt comprising a series of second belt freezing plates, each second belt plate having a contacting surface; and a driving system for driving the plate belts. The plate belts of the preferred inventive apparatus are positionable adjacent to each other and are operable in a synchronized manner such that an article placed on the contacting surface of any given first belt freezing plate will be compressed and temporarily held between the contacting surface of the first belt freezing plate and the contacting surface of a corresponding second belt freezing plate. The driving system of the preferred inventive apparatus is operable for driving the plate belts in this synchronized manner.

30 Claims, 17 Drawing Sheets

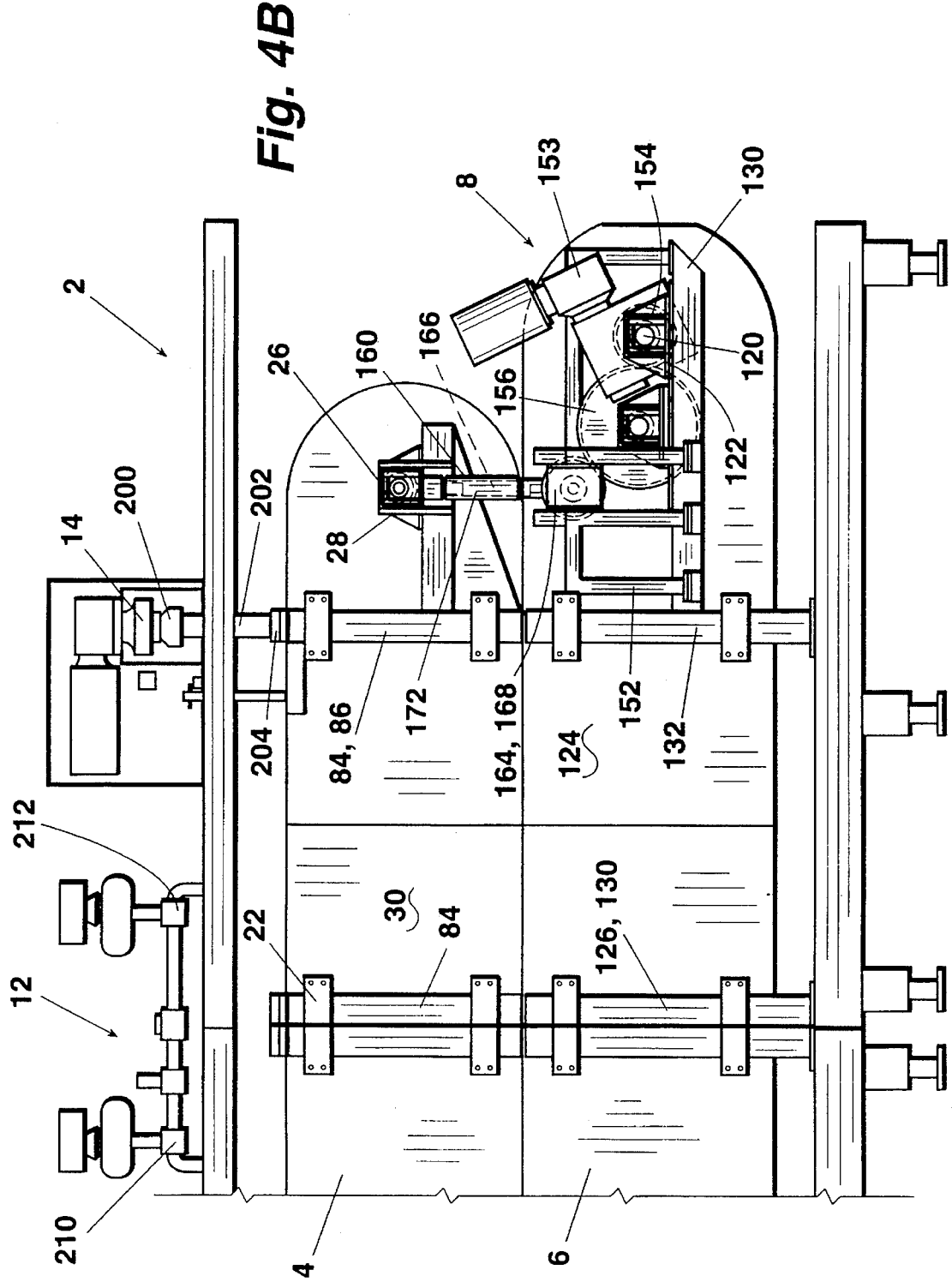

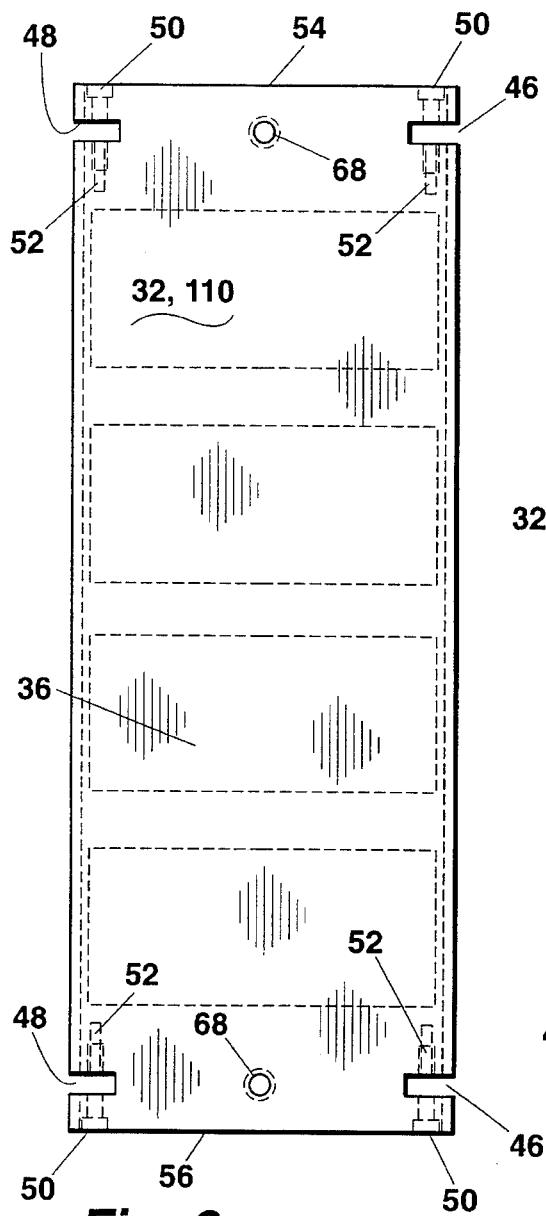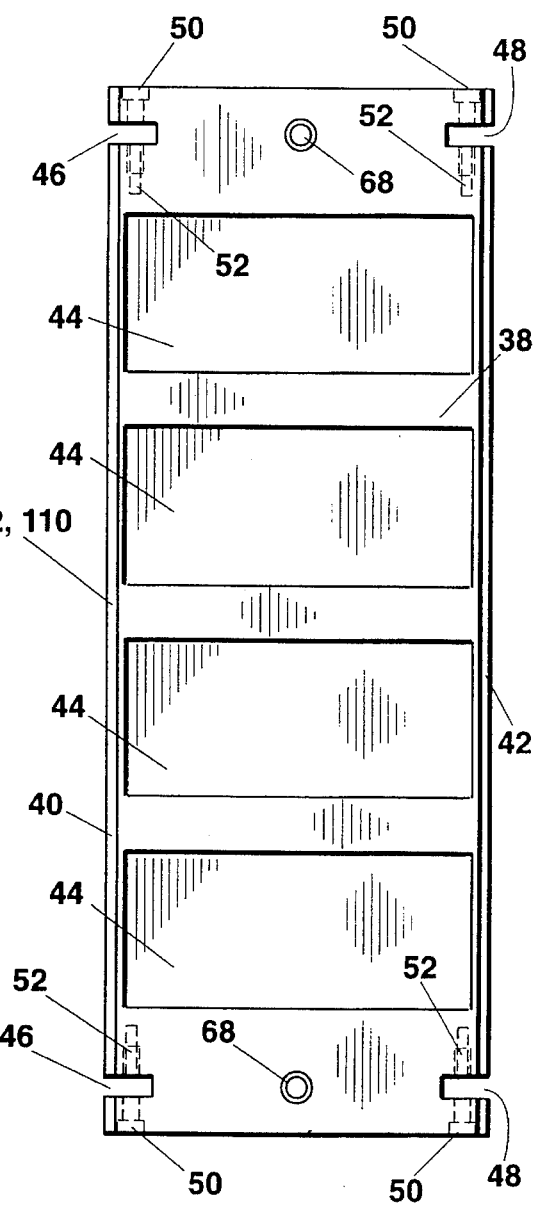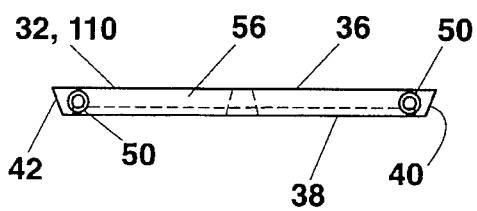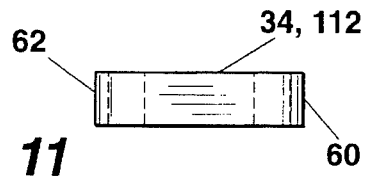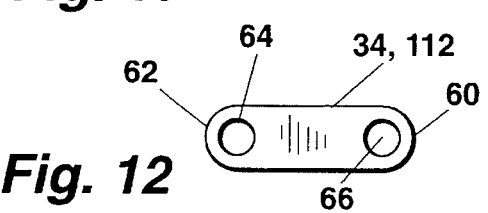

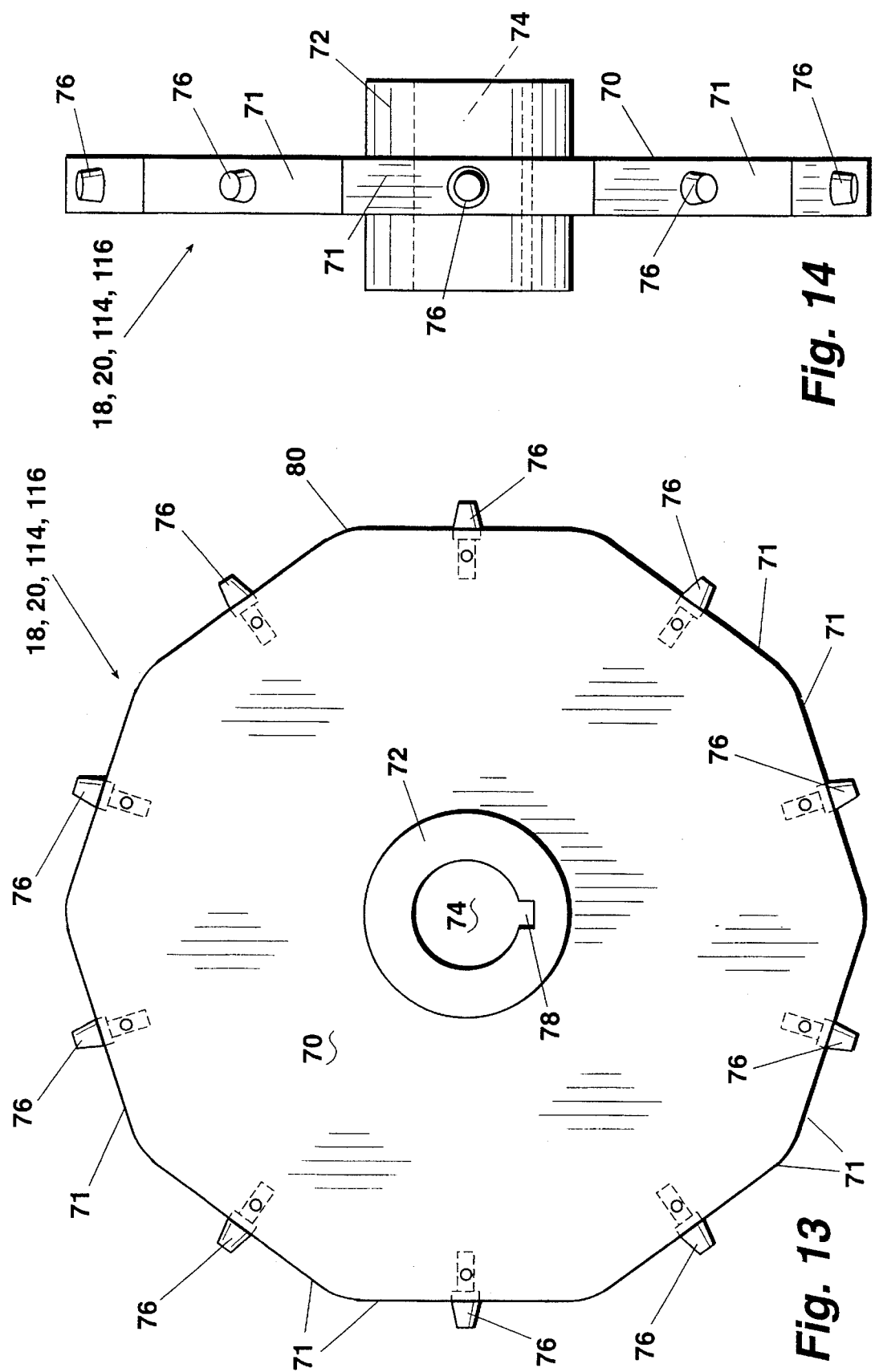

FREEZING SYSTEM

This is a continuation of copending application Ser. No. 08/271,497 filed on Jul. 7, 1994.

FIELD OF THE INVENTION

The present invention relates to compression-type freezing devices. Further, the present invention relates to methods of freezing food products using compression-type freezing devices and to frozen food products produced thereby.

BACKGROUND OF THE INVENTION

A need presently exists for a system for freezing boneless chicken products (e.g., marinaded or nonmarinaded chicken breast fillets) and other boneless food products whereby the resulting frozen products have highly uniform thickness profiles. A need particularly exists for such a freezing system wherein: (a) moisture and marinade losses are minimized; (b) when thawed, the products do not substantially spring back to their original thickness profile; (c) the natural shapes of the products, as viewed from the top and bottom thereof, are substantially maintained; (d) the surfaces of the frozen products are substantially free from marks, cracks, and other surface imperfections; (e) product breakage is minimized; and (f) freezing time is reduced.

The achievement of a highly uniform frozen product thickness profile is desirable for numerous reasons. For example, the achievement of a consistent, uniform, product thickness would provide a substantial health safety benefit by allowing more standardized product cooking procedures to be used. Additionally, the provision of a uniform frozen product thickness would improve the packaging characteristics of the frozen product and would improve product plate or bun coverage.

One system used heretofore for freezing boneless chicken fillets consists of a marination tub, a roller-type press, and a mechanical freezer. In this system, 40° to 45° F. marinaded product from the marination tub is conveyed through the roller-type press before being frozen in the mechanical freezer. The roller-type press is intended to operate as a means for imparting a uniform thickness profile to the product. Unfortunately, however, the compressed shape imparted by the roller-type press is only partially retained during the freezing process. Additionally, the amount of time required for mechanically freezing the product is undesirably high (i.e., typically about 40 minutes for marinaded chicken breast fillets). Also, due to marinade seepage and moisture loss, approximately 7 weight percent of the product is typically lost during the pressing and freezing operations. Further, due primarily to the number of product transfer points involved in this system and to the characteristics of the wire mesh conveyor systems typically used in mechanical freezers, the frozen product obtained from this prior art system is characterized by an undesirable degree of breakage and surface imperfections (e.g., cracks and freezer belt impressions).

Another system used heretofore for freezing boneless chicken breast fillets consists of a marination tub, a nitrogen bath, a roller-type press, and a mechanical freezer. This system is identical to the system just described except that, prior to being conveyed through the roller-type press, the food product is dipped in liquid nitrogen. Using this system, approximately 25% of the overall product Btu removal occurs in the nitrogen bath. Consequently, product residence time in the mechanical freezer is desirably reduced to about 30 to 35 minutes. Unfortunately, however, the use of a nitrogen bath provides only a slight improvement in product thickness profile retention. Further, the use of a nitrogen bath only slightly reduces yield losses, product breakage, and surface imperfections.

SUMMARY OF THE INVENTION

The present invention provides a novel freezing system which satisfies the needs discussed hereinabove. Specifically, the inventive freezing system provides a frozen product which (a) has a highly uniform thickness profile, (b) retains its natural shape as viewed from the top and bottom thereof, and (c) does not substantially spring back to its original thickness profile when thawed. Additionally, the inventive freezing system substantially reduces product freezing time and substantially alleviates product breakage, surface damage, marinade loss, and moisture loss problems. Although the inventive freezing system can be used for freezing substantially any boneless meat product, it is particularly well-suited for freezing boneless chicken breast fillets.

The present invention provides a method of freezing a product comprising the step of compressing the product between a cooled first contacting surface and a cooled second contacting surface for a time effective for at least partially freezing the product. The inventive method also preferably includes the step of cooling the contacting surfaces such that the temperature of the first contacting surface is below the freezing temperature of the product and the temperature of the second contacting surface is below the freezing temperature of the product. In this step of cooling, the first contacting surface and the second contacting surface are preferably each cooled to a temperature in the range of from about −50° F. to about −180° F.

The present invention also provides a frozen boneless meat product produced by a method comprising the step of compressing a boneless meat product between a cooled first contacting surface and a cooled second contacting surface for a time effective for at least partially freezing the boneless meat product. When the cooled first contacting surface initially contacts the boneless meat product, the temperature of the cooled first contacting surface is below the freezing temperature of the boneless meat product. When the cooled second contacting surface initially contacts the boneless meat product, the temperature of the cooled second contacting surface is also below the freezing temperature of the boneless meat product. When the cooled first contacting surface initially contacts the boneless meat product, the temperature of the cooled first contacting surface is preferably in the range of from about −50° F. to about −180° F. Additionally, when the cooled second contacting surface initially contacts the boneless meat product, the temperature of the cooled second contacting surface is preferably in the range of from about −50° F. to about −180° F.

The present invention additionally provides a freezing apparatus comprising: a first contacting surface; a second contacting surface; cooling means for cooling the contacting surfaces; and compressing means for positioning the contacting surfaces adjacent to each other in a manner effective for compressing an article to be frozen between the contacting surfaces.

The present invention further provides a freezing apparatus comprising: a lower belt; an upper belt; a cooling means for cooling the belts; and driving means for driving the belts. The belts are positionable adjacent to each other and are operable in a synchronized manner such that articles to be frozen will be compressed and temporarily held between the belts. Further, the driving means used in the inventive apparatus is operable for driving the conveyors in said synchronized manner.

In a preferred embodiment, the inventive freezing apparatus comprises: a first plate belt comprising a series of first belt freezing plates, each of said first belt freezing plates having a contacting surface; a second plate belt comprising a series of second belt freezing plates, each of said second belt freezing plates having a contacting surface; and a driving means for driving the plate belts. The plate belts are positionable adjacent to each other and are operable in a synchronized manner such that articles placed on the first plate belt will be compressed and temporarily held between the contacting surfaces of corresponding pairs of first and second belt freezing plates. The driving means is operable for driving the plate belts in said synchronized manner.

Further objects, features, and advantages of the present invention will be apparent upon reference to the accompanying drawings and upon reading the following description of the preferred embodiments.

BRIEF DESCRIPTION OF THE DRAWINGS

FIGS. 4A and 4B provide a cutaway front elevational view of inventive freezer 2. FIG. 4A also depicts an in-feed conveyor system 196 operably associated with inventive freezer 2.

FIG. 8 provides a top view of a freezing plate 32 or 110 used in inventive freezer 2.

FIG. 9 provides an end view of freezing plate 32 or 110.

FIG. 10 provides a bottom view of freezing plate 32 or 110.

FIG. 11 provides a top view of a plate connector 34 or 112 used in inventive freezer 2.

FIG. 12 provides an elevational side view of connector 34 or 112.

FIG. 13 provides an elevational front view of a plate belt sprocket 18, 20, 114, or 116 used in inventive freezer 2.

FIG. 14 provides an elevational side view of sprocket 18, 20, 114, or 116.

In FIG. 18, portions of upper plate belt 16 and lower plate belt 108 are omitted in order to show the positioning, relationship, and various features of the inner portions 82 and 128 of frames 22 and 126.

FIG. 23 also shows a conveyor system 278 and worker platform associated with in-feed conveyor system 196.

DESCRIPTION OF THE PREFERRED EMBODIMENTS

Figure 1:
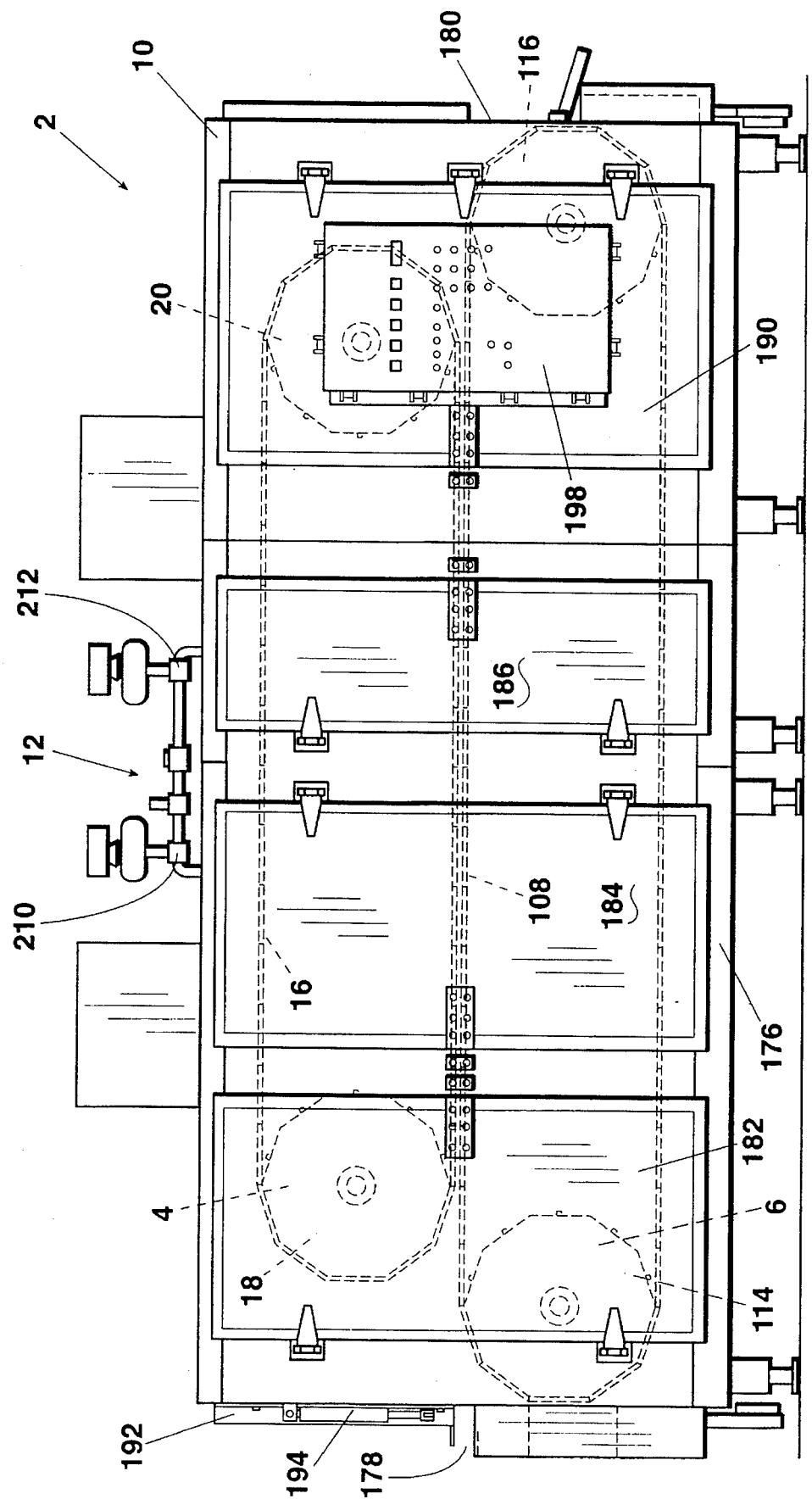
FIG. 1 provides an elevational front view of a first embodiment 2 of a dual contact, continuous, compression-type freezer provided by the present invention.

An embodiment 2 of the dual contact, continuous, compression-type freezing apparatus provided by and used in the present invention is depicted in FIGS. 1–23. Inventive freezer 2 comprises: an upper plate belt system 4; a lower plate belt system 6 which operates in a synchronous relationship with upper belt system 4; a driving system 8 for driving belt systems 4 and 6; a housing 10 wherein belt systems 4 and 6 and driving system 8 are contained; a cooling system 12 for cooling plate belt systems 4 and 6; and a lifting system for lifting upper belt system 4 with respect to lower belt system 6.

Upper plate belt system 4 preferably comprises: an upper plate belt 16; two inlet end idling sprockets 18 which are engaged by belt 16; two outlet end driving sprockets 20 which engage belt 16; an upper belt system frame 22; an inlet end sprocket shaft 24 having idling sprockets 18 mounted thereon; an outlet end sprocket shaft 26 having driving sprockets 20 mounted thereon; a plurality of upper shaft bearings 28 which are used to rotatably mount sprocket shafts 24 and 26 on frame 22; and two shields 30, one of which covers one side of upper plate belt system 4 and the other of which covers the other side of upper plate belt system 4.

Upper plate belt 16 comprises a plurality of serially connected freezing plates 32. Freezing plates 32 are linked together by means of a plurality of plate connectors 34. As shown in FIGS. 8–10, each of freezing plates 32 preferably comprises: a flat contacting surface 36 on one side thereof; a second side 38 positioned opposite contacting surface 36; a tapered front edge 40 which slopes inwardly from contacting surface 36 to second side 38; a tapered back edge 42 which slopes inwardly from contacting surface 36 to a second side 38; one or more (preferably four) recesses or reservoirs 44 formed in second side 38 for receiving and temporarily holding a coolant (e.g., liquid nitrogen); a plurality of (preferably two) connector slots 46 extending through front edge 40 for receiving a corresponding number of plate connectors 34; a plurality of (preferably two) connector slots extending through back edge 42 for receiving a corresponding number of plate connectors 34; and a plurality of (preferably four) bores 50 extending into the side edges 54 and 56 of plate 32 through slots 46 and 48 and having threaded portions 52. Partially threaded bores 50 are provided for pivotably connecting plate connectors 34 to plates 32 using bolts or other such threaded devices.

Each freezing plate 32 also preferably has a pair of apertures 68 extending therethrough. Apertures 68 are preferably positioned on the longitudinal axis of plate 32 such that one aperture 68 is positioned adjacent side edge 54 and the other aperture 68 is positioned adjacent side edge 56. Apertures 68 are preferably frusto-conically shaped such that each aperture 68 diverges as it extends downwardly from contacting surface 36 to second side 38.

A plate connector 34 is depicted in FIGS. 11 and 12. Each plate connector 34 preferably has a rounded front end 60 and a rounded back end 62. The horizontal thickness of each plate connector 34 is such that plate connectors 34 can be received in connector slots 46 and 48. The vertical thickness of each connector 34 is preferably substantially equivalent to the thickness of freezing plates 32. Horizontal cylindrical bores 64 and 66 are provided in the front and back ends of connectors 34 for receiving the bolts or other threaded devices used for pivotably connecting connectors 34 to freezing plates 32. Connectors 34 are preferably formed from stainless steel.

Freezing plates 32 can be formed from stainless steel, aluminum, or generally any other material which can withstand the extremely cold operating conditions employed in inventive freezer 2. Freezing plates 32 are most preferably formed from aluminum. Additionally, the contacting surface 36 of each aluminum freezing plate 32 will preferably be hard-coat anodized to provide an aluminum oxide coating thereon. This anodized hard-coat is preferably sealed with nickel acetate and preferably has a Rockwell hardness rating in the range of from about C60 to C70.

Aluminum is preferred for use in forming freezing plates 32 due to its desirable heat transfer and machining characteristics. Further, hard-coat anodized freezing plates of the type described hereinabove are highly corrosion resistant and provide excellent hardness and product release characteristics.

Idling sprockets 18 are preferably identical to driving sprockets 20. As shown in FIGS. 13 and 14, each of sprockets 18 and 20 preferably comprises: a flat plate portion 70 having a plurality of (preferably 10) sides 71; a hub 72 provided in the center of plate portion 70 and having a bore 74 extending therethrough for receiving a sprocket shaft 24 or 26; and a plurality of (preferably 10) lugs 76 projecting from sides 71. The transitional edge portions 80 provided between sides 71 are preferably rounded in the manner depicted in FIG. 13. Each of sides 71 preferably has a lug 76 projecting outwardly from the center thereof. Additionally, the length of each side 71, the shape and size of lugs 76, and the positioning of lugs 76 on sides 71 is such that, when plate belt 16 is placed on sprockets 18 and 20, lugs 76 mate with plate apertures 68.

Each sprocket hub bore 74 preferably has a keyway slot 78 provided therein for receiving a locking key. Corresponding keyway slots are preferably provided on sprocket shafts 24 and 26 whereby locking keys can be placed in the shaft and sprocket slots to lock the sprockets in position on shafts 24 and 26 and thereby prevent sprockets 18 and 20 from independently rotating about sprocket shafts 24 and 26.

The projecting portion of each lug 76 is preferably tapered. Most preferably, as shown in FIGS. 13 and 14, the projecting portion of each lug 76 is shaped in the form of a frustum of a cone such that the diameter of the distal end of the lug 76 is less than the diameter of the base portion of the lug 76. This shape corresponds to the preferred shape of plate apertures 68. Tapered lugs 76 of the type depicted in FIGS. 13 and 14 will accommodate some degree of component shrinkage, expansion, and/or stretch within inventive freezer 2 such that, in spite of such occurrences, lugs 76 will continue to mate with freezing plate apertures 68 and the synchronized operation of plate belt systems 4 and 6 will be maintained.

Upper belt system frame 22 comprises an inner frame portion 82 and an outer frame portion 84. Outer frame portion 84 includes a plurality of vertical structural posts 86. Outer frame portion 84 preferably includes at least four structural posts 86 such that a structural post 86 is positioned at each corner of frame 22.

When the inventive freezer is assembled, upper plate belt 16 extends over and covers the top and bottom of interior frame portion 82. Structural posts 86, on the other hand, are positioned outside of upper plate belt 16 such that threaded jackscrew shafts 202 extending downwardly from the top of inventive freezer 2 can be attached to vertical posts 86 without interfering with the operation of plate belt 16.

Inner portion 82 of upper frame 22 comprises: a primary internal frame structure 88; a pair of belt contacting panels 90 and 92 positioned on top of primary structure 88; and a pair of belt contacting panels 94 and 96 positioned on the bottom of primary structure 88. Contacting panels 90 and 92 are positioned end-to-end such that panels 90 and 92 extend across the top of primary structure 88. Contacting panels 94 and 96 are positioned end-to-end such that panels 94 and 96 extend across the bottom of primary structure 88.

Contacting panels 90 and 92 are preferably attached in fixed relationship (e.g., by welding, bolting, or other such means) to the top of primary structure 88. In like manner, contacting panel 94 is preferably attached in fixed relationship to the bottom of primary structure 88. Contacting panel 96, on the other hand, is preferably mounted on the bottom of primary structure 88 in a manner such that (a) the inner end of panel 96 is attached in fixed or pivoting relationship with the bottom of structure 88 and (b) the outer end of panel 96 is attached, by means of bolts 104 and springs 106, in a spring-loaded relationship with the bottom of structure 88. The partially spring-loaded attachment of contacting panel 96 provides a floating effect which reduces top belt friction while ensuring that freezing contact is maintained.

Each of contacting panels 90 and 92 has three elongate belt support strips 98 connected to and extending across the top thereof. Each of belt contacting panels 94 and 96, on the other hand, preferably has five elongate plate belt support strips 102 connected to and extending over the bottom thereof. Upper belt system frame 22 is preferably positioned in inventive freezer 2 such that the spring-loaded end of contacting panel is positioned adjacent the exit end of freezer 2.

Each of elongate belt support strips 98 and 102 preferably has a rounded edge which contacts the interior side of upper plate belt 16. Additionally, each of elongate support strips 98 and 102 is preferably composed of a low friction material such as ultrahigh molecular weight teflon.

As mentioned above, sprocket shafts 24 and 26 are rotatably mounted to upper frame 22 by means of shaft bearings 28. Shaft bearings 28 are preferably low-friction, plastic bearings which can withstand the extremely cold conditions within inventive freezer 2. Bearings 28 are most preferably pillow block-type bearings formed from ultrahigh molecular weight teflon. Specifically, each of bearings 28 preferably comprises a block of ultrahigh molecular weight teflon having a cylindrical bore extending therethrough for receiving sprocket shaft 24 or 26.

Shields 30 extend over the sides of upper plate belt assembly 4. Shields 30 are preferably installed between inner frame portion 82 and outer frame portion 84 of upper frame 22. To facilitate assembly, shields 30 can be comprised of a plurality of associatable, interconnecting panels having cutout portions provided therein which accommodate the transitional frame structures extending between inner frame portion 82 and outer frame portion 84. Shields 30 are preferably formed from plastic and are most preferably formed from ultrahigh molecular weight teflon. Shields 30 enhance the belt cooling process by retaining coolant material (e.g., vaporized nitrogen) within the upper belt loop.

Figure 7:
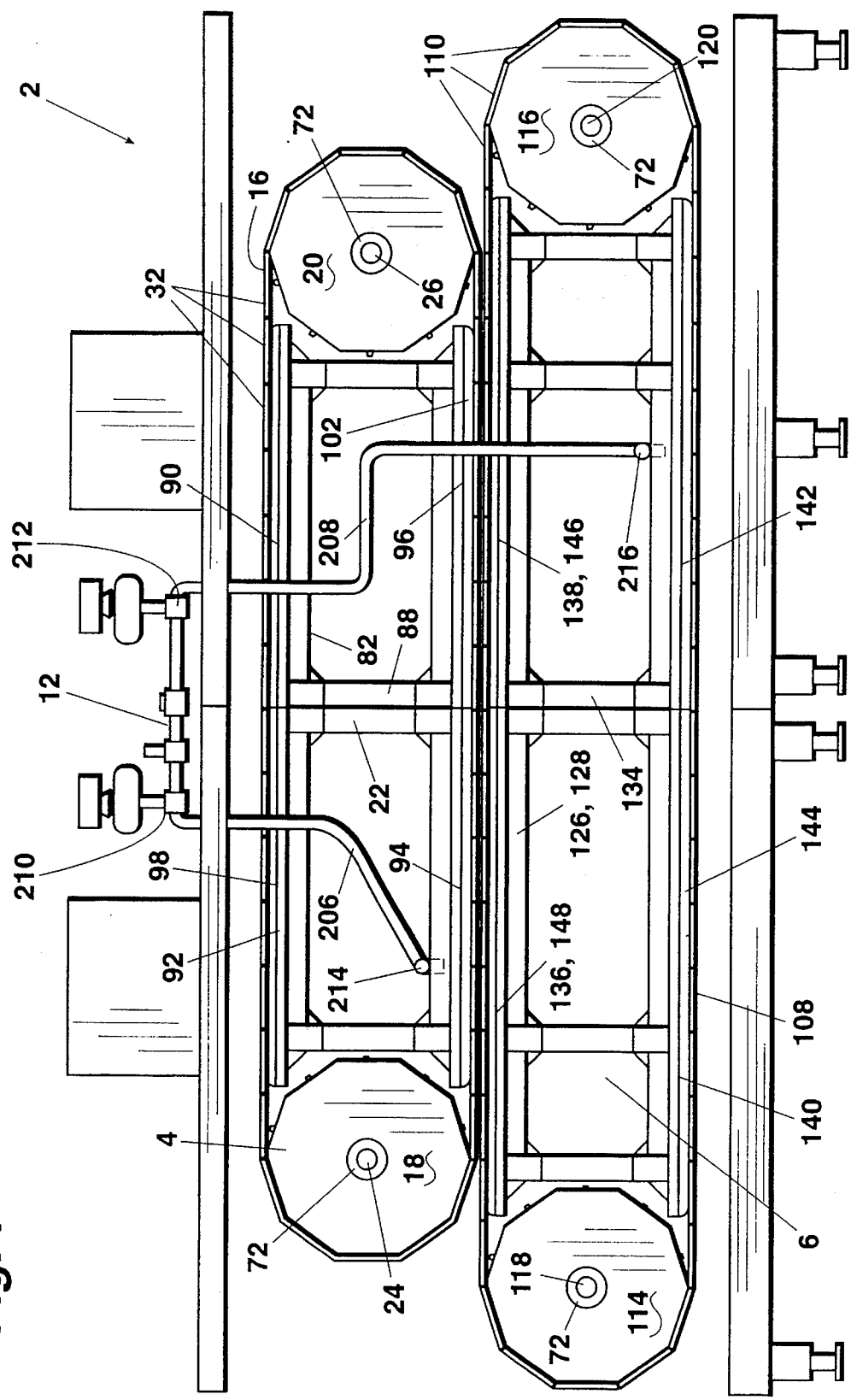
FIG. 7 provides a cutaway front elevational view of inventive freezer 2.
Figure 15:
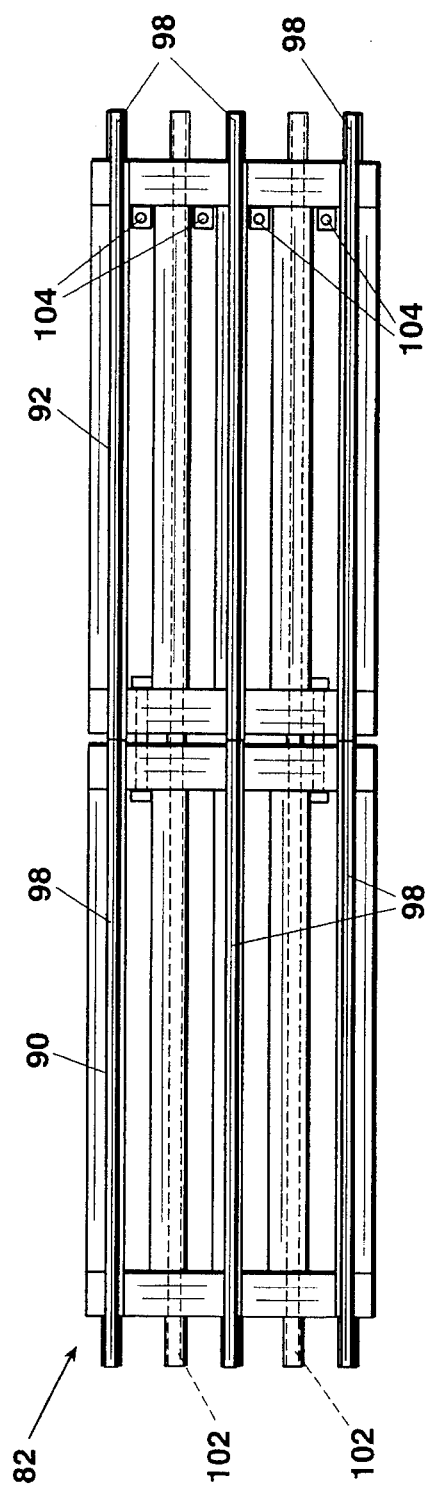
FIG. 15 provides a top view of the inner portion 82 of an upper belt system frame 22 used in inventive freezer 2.
Figure 16:
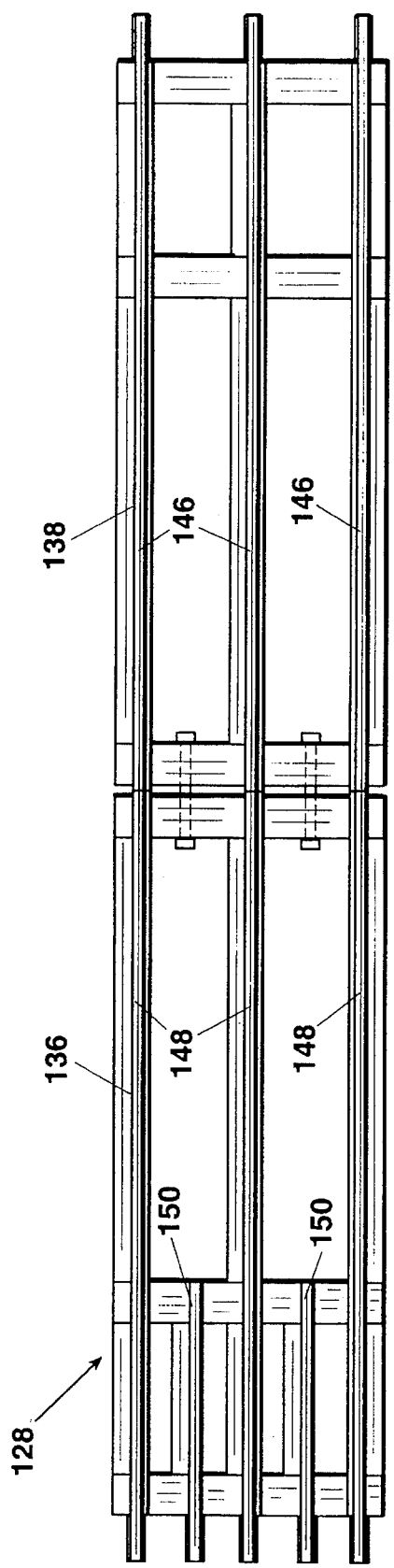
FIG. 16 provides a top view of the inner portion 128 of a lower belt system frame 126 used in inventive freezer 2.
Figure 17:
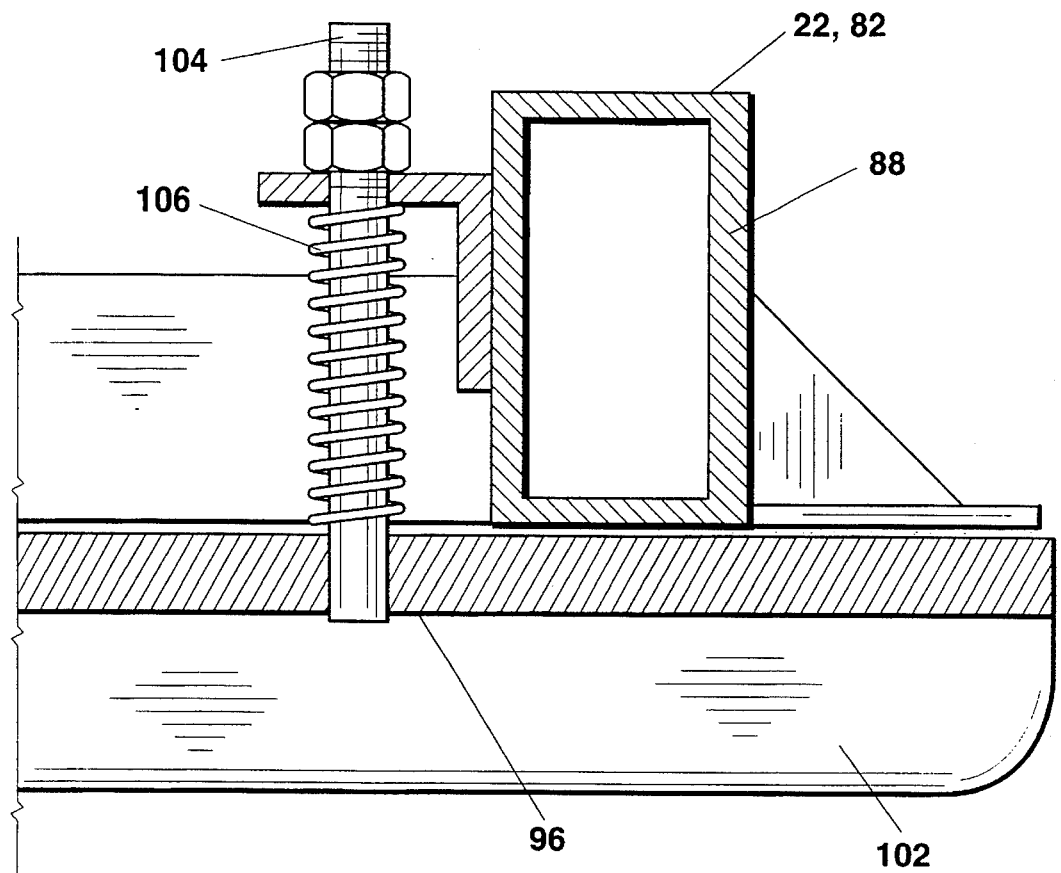
FIG. 17 provides an enlarged cutaway side view of a bottom, outlet end portion of inner portion 82 of upper frame 22.

As indicated in FIGS. 1, 4, and 7, the length of lower plate belt system 6 preferably exceeds that of upper plate belt system 4. Otherwise, except for some minor differences in frame construction, lower belt system 6 is preferably substantially identical to upper belt system 4. Specifically, lower belt system 6 preferably includes (a) a lower plate belt 108 comprised of freezing plates 110 and connectors 112 which are identical to the freezing plates 32 and plate connectors 34 used in upper system 4, (b) two inlet end idling sprockets 114 which are identical to upper idling sprockets 18, (c) two outlet end driving sprockets 116 which are identical to upper driving sprockets 20, (d) an inlet end sprocket shaft 118 which is identical to upper sprocket shaft 24, (e) an outlet end sprocket shaft 120 which is identical to upper sprocket shaft 26, (f) a plurality of shaft bearings 122 which are identical to shaft bearings 28, and (g) two side shields 124 which, except for their length and the positioning of cutouts to accommodate the lower system frame, are substantially the same as upper side shields 30.

Like upper belt system frame 22, lower belt system frame 126 includes an inner frame portion 128 and an outer frame portion 130. As with the outer portion 84 of upper frame 22, outer portion 130 of lower frame 126 includes a plurality of vertical structural posts 132. Also, in generally the same manner as upper belt system frame 22, the inner portion 128 of lower frame 126 comprises: a primary internal frame structure 134; a pair of belt contacting panels 136 and 138 connected to and extending over the top of primary frame structure 134; and a pair of belt contacting panels 140 and 142 connected to and extending over the bottom of primary frame structure 134.

Lower belt system frame 126 differs from upper belt system frame 122 in that (a) each of contacting panels 136, 138, 140, and 142 is attached in fixed relationship to primary frame structure 134, (b) each of belt contacting panels 140 and 142 has three elongate belt support strips 144 attached thereto, (c) belt contacting panel 138, which is positioned adjacent the exit end of inventive freezer 2, has three elongate belt support strips 146 connected thereto, (d) belt contacting panel 136 has three elongate plate support strips 148 connected thereto which extend over the entire length of contacting panel 136, (e) belt contacting panel 136 further includes two shorter belt support strips 150 provided at the outer end of contacting panel 136 and positioned between belt support strips 148, (f) structural posts 132 included in the outer portion 130 of lower frame 126 extend upwardly from the floor of freezer housing 10 and operate to support lower belt system 6 within inventive freezer 2, and (g) the outer portion 130 of frame 126 includes a drive system support structure 152 for supporting various components of drive system 8.

Driving system 8 is operable for driving upper plate belt 16 in a synchronized manner with lower plate belt 108 such that, as each lower plate 110 travels across the top of lower belt system 6, it is paired with, and moves in unison with, a corresponding upper freezing plate 32 traveling across the bottom of upper belt system 4. Throughout the time that each of these lower plate/upper plate pairs travels from the inlet end to the outlet end of inventive freezer 2, the contacting surface 36 of the upper plate 32 remains squarely positioned immediately above the contacting surface 36 of the lower plate 110. Additionally, as the plate pairs travel from the inlet end to the outlet end of inventive freezer 2, the contacting surfaces 36 of upper plates 32 are spaced above the contacting surfaces 36 of lower plates 110 such that a desired preselected thickness is imparted to the articles being compressed and frozen within the inventive freezer.

As a result of the synchronized movement of plate belts 16 and 108, articles (e.g., boneless chicken breast fillets and other boneless meat products) placed in the inlet of inventive freezer 2 on the contacting surface 36 of any given lower freezing plate 110 will be automatically contacted by a corresponding upper freezing plate 32 such that said articles are compressed and held between the contacting surface 36 of the lower plate 110 and the contacting surface 36 of the upper plate 32. Moreover, the compressed articles will be held between the contacting surfaces 36 of the upper and lower freezing plates 32 and 110 as the articles are conveyed by upper and lower plate belts 16 and 108 from the inlet end to the outlet end of inventive freezer 2. Additionally, with the contacting surface 36 of upper plate 32 positioned squarely above the contacting surface 36 of lower plate 110, the articles can desirably be placed between plates 32 and 110 such that the articles, when compressed between the plates, do not extend over any of the edges of the plate contacting surfaces.

Driving system 8 includes lower sprocket drive shaft 120, lower driving sprockets 116, upper sprocket drive shaft 26, and upper driving sprockets 20. Driving system 8 preferably further comprises: a motorized driving unit 153 which is connected to, and is operable for turning, lower sprocket drive shaft 120; a first gear 154 provided on lower sprocket drive shaft 120; a second gear 156 rotatably mounted on lower belt system frame 126 and operably engaged by first gear 154; and a gear and telescoping shaft assembly 160 mounted on frame 126 and operably engaged by second gear 156.

Gear and telescoping shaft assembly 160 comprises: a lower gear 164 which is operably engaged by second gear 156; a vertical rotating shaft 166 which is operably associated with lower gear 164 by means of a lower gear box 168; an upper gear box 170 which is operably associated with upper drive shaft 26; and a hollow, rotating shaft 172 which is telescopingly received over vertical shaft 166 and is operably associated with upper gear box 170. Vertical shaft 166 preferably has a square external cross-sectional shape. Moreover, hollow shaft 172 preferably has a square internal cross-sectional shape which corresponds to the external shape of vertical shaft 166.

In order to maintain the synchronized plate relationship discussed hereinabove, the various components of driving system 8 should be sized such that upper drive shaft 26 is rotated at the same speed as lower drive shaft 120.

Figure 4A:
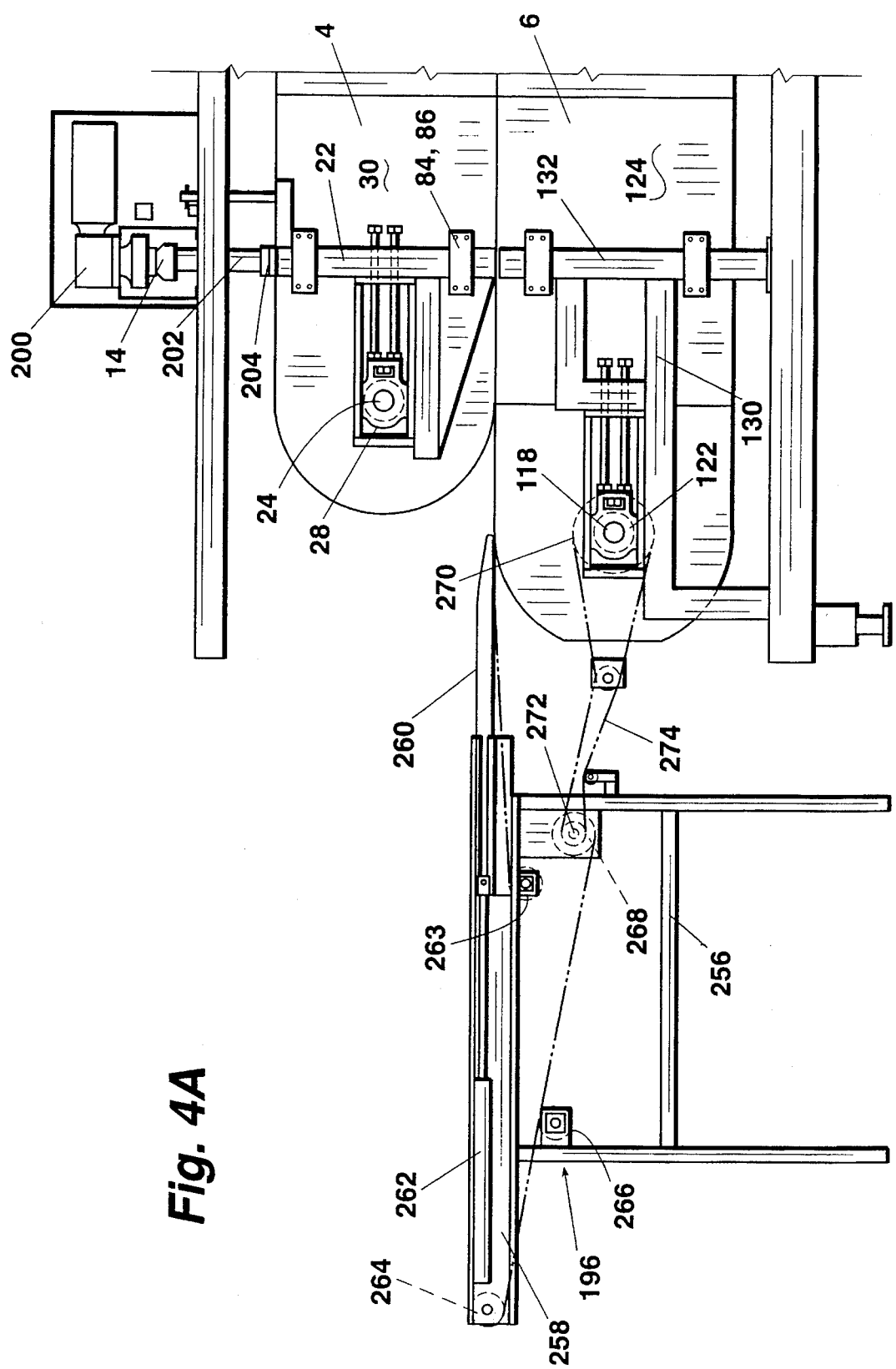
Figure 5:
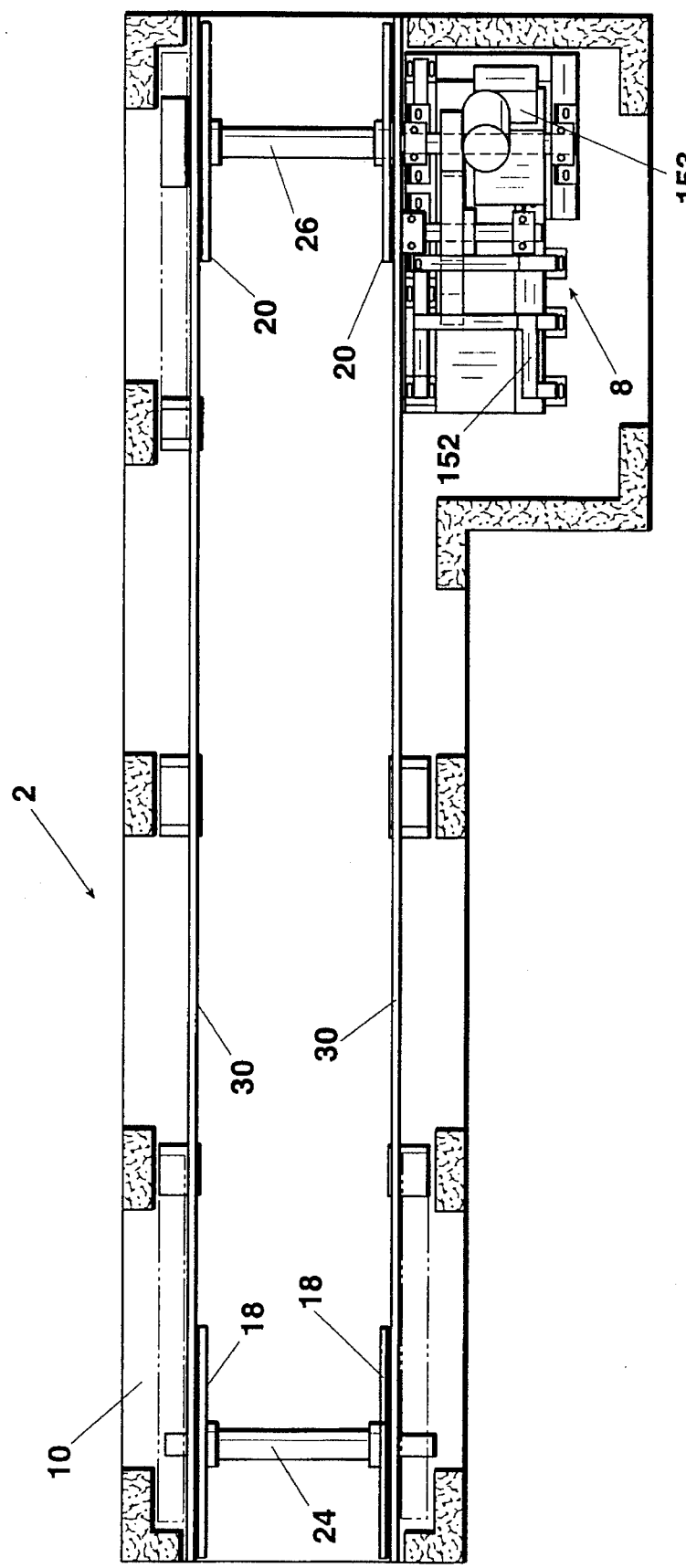
FIG. 5 provides a cutaway top view of inventive freezer 2.
Figure 6:
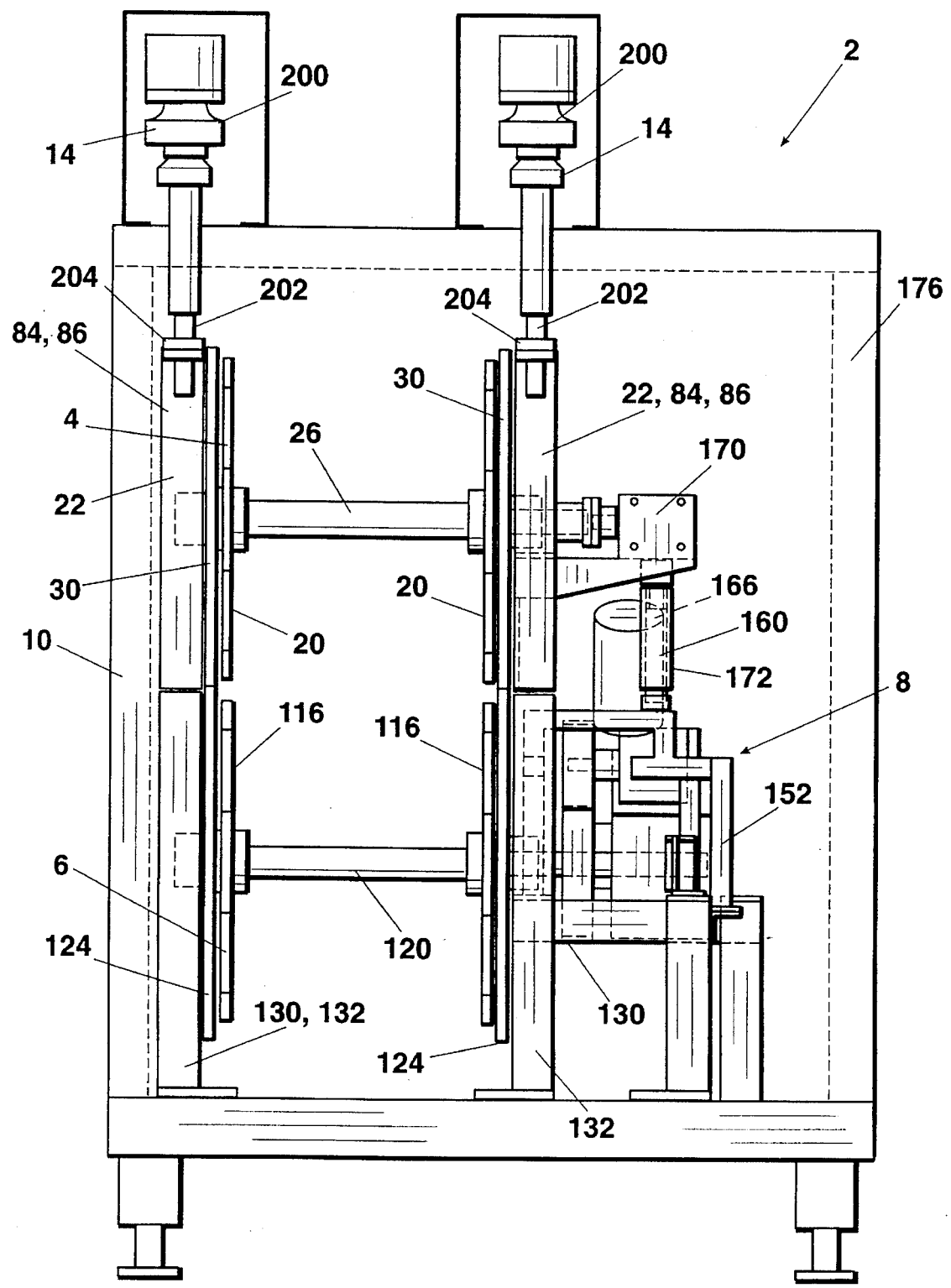
FIG. 6 provides a cutaway side view of inventive freezer 2.

Motorized driving unit 153 can generally be any type of motor or motor and gear combination commonly used for driving conveyor-type systems. As depicted in FIGS. 4–6, motorized driving unit 153 is most preferably a standard hollow shaft-type driving assembly which utilizes a variable speed electrical motor. The speed of the electrical motor is preferably sufficiently adjustable such that product dwell time within inventive freezer 2 can be selectively controlled within the range of from about 0.20 to about 3.0 minutes.

As will be understood by those skilled in the art, the preferred driving system 8 described above could be replaced with a chain-type driving system or with generally any other type of driving system used in the art for achieving synchronous operation. However, the preferred driving system 8 is not susceptible to synchronization problems which would otherwise result from chain shrinkage, chain stretching, chain expansion, etc.

By using the preferred driving system 8 described hereinabove, upper plate belt system 4 can also be easily raised and lowered with respect to lower plate belt system 6 without having to disconnect or disassemble the driving system. When upper plate belt system 4 is raised or lowered with respect to lower plate belt system 6, hollow shaft 172 of telescoping assembly 160 simply slides in a telescoping manner along the exterior of vertical shaft 166.

Upper plate belt system 4, lower plate belt system 6, and driving system 8 are contained in housing 10. Housing 10 preferably comprises: a freezer cabinet 176 having an inlet end opening 178 and an exit end opening 180; a plurality of hinged doors 182, 184, 186, and 190 which provide access to the interior of cabinet 176; and a sliding inlet door 192 positioned over inlet opening 178. Sliding door 192 can be selectively opened to allow an in-feed conveyor system 196 to be inserted into inlet opening 178. Sliding inlet door 192 can also be selectively closed when in-feed conveyor system 196 is withdrawn (e.g., for cleaning purposes) from inlet opening 178.

Hydraulic cylinders 194 or other means can optionally be connected between sliding door 192 and cabinet 176 for operating sliding door 192. As will be understood by those skilled in the art, the operation of sliding door 192 can optionally be automated using standard instrumentation whereby sliding door 192 automatically closes, preferably after a brief time delay, when in-feed conveyor 196 is withdrawn from inlet opening 178.

Figure 2:
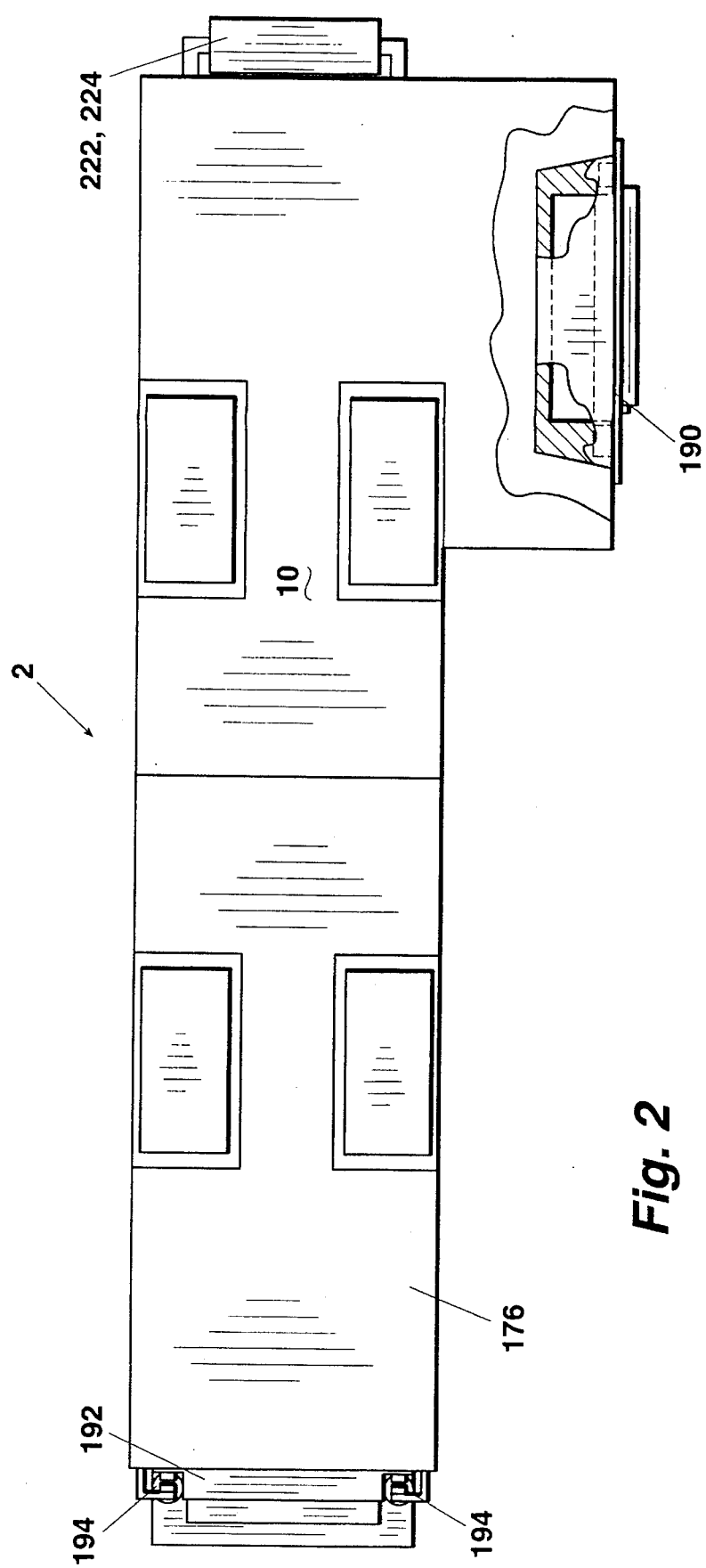
FIG. 2 provides a partially cutaway top view of inventive freezer 2.
Figure 3:
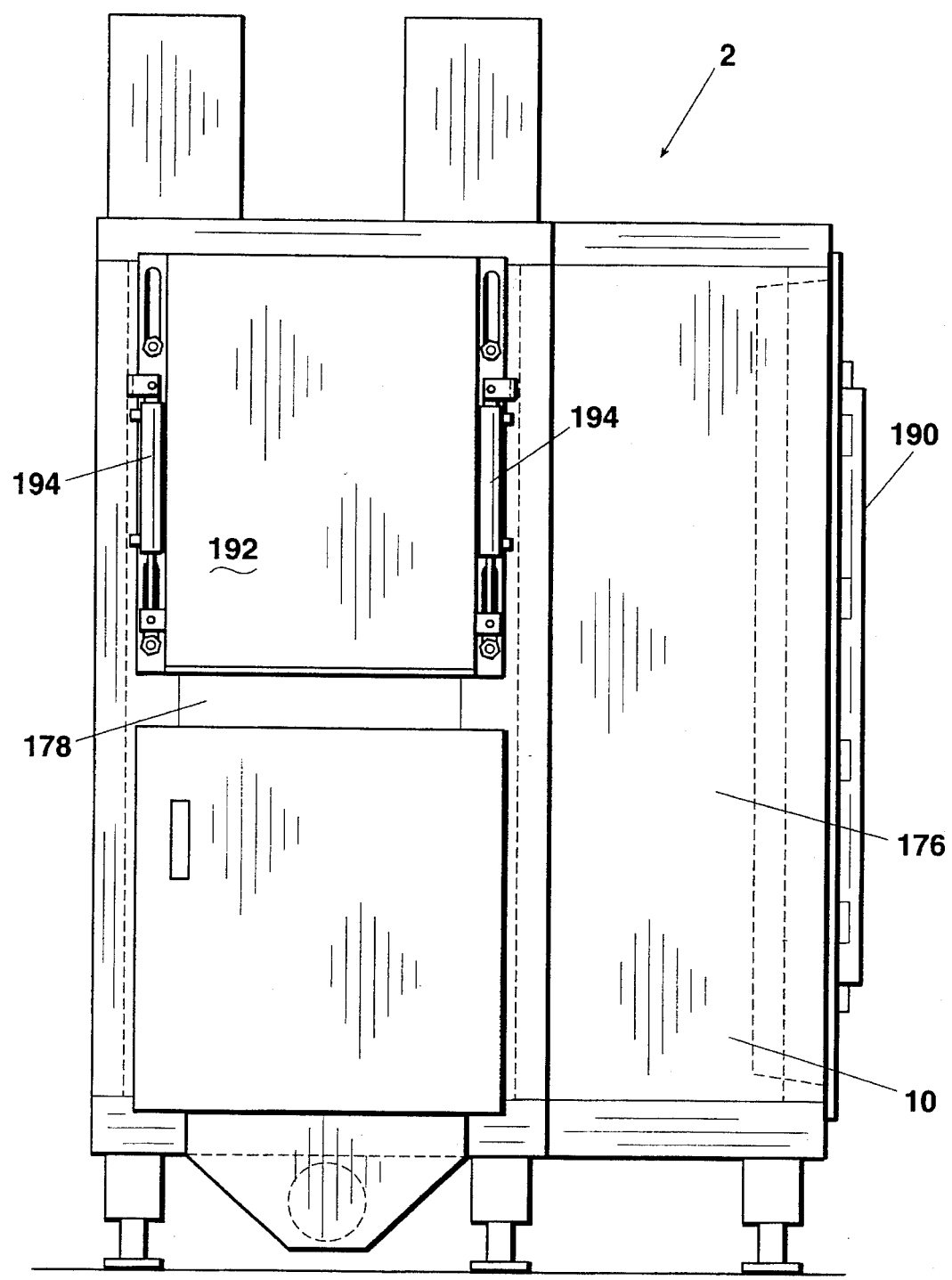
FIG. 3 provides an elevational inlet end view of inventive freezer 2.

Cabinet 176 and doors 182, 184, 186, and 190 are preferably each comprised of an inner metallic (e.g., stainless steel) or plastic wall, an outer metallic (e.g., stainless steel) or plastic wall, and a layer of insulation (e.g., polyisocyanurate) sandwiched between the inner and outer walls. Sealing gaskets or other sealing means are also preferably provided on cabinet 176 or around doors 182, 184, 186, and 190 for preventing air, gas, and/or liquid leakage when doors 182, 184, 186, and 190 are closed. Additionally, as indicated in FIG. 2, door 190 can optionally be a deep door having a cavity formed in the front thereof for receiving and holding an instrument and control panel 198 for inventive freezer 2.

As mentioned above, upper plate belt system 4 can be selectively raised and lowered with respect to lower belt system 6 by means of an upper belt lifting system 14. Lifting system 14 preferably comprises a plurality of jackscrews 200 mounted on, and having threaded Shafts 202 extending through, the top of housing cabinet 176. Each threaded shaft 202 is threadedly received in a nut or other internally threaded member 204 attached in fixed position in the top of an upper system frame post 186. Belt lifting system 14 most preferably includes at least four electrically operated jackscrews 200 such that a separate jackscrew 200 is operably associated with each corner of upper system frame 22. Since jackscrew shafts 202 are secured in fixed vertical position in housing 10 and since upper belt system frame 22 is secured in housing 10 only by means of the threaded connections between threaded shafts 202 and internally threaded members 204, the rotation of shafts 202 within threaded members 204 causes upper frame 22 to move vertically within housing 10.

Upper freezing plates 32 and lower freezing plates 110 can be chilled by directly applying a coolant to the plates. Freezing plates 32 and 110 are preferably chilled by directly applying carbon dioxide snow or liquid nitrogen thereto. Freezing plates 32 and 110 are most preferably chilled by directly applying liquid nitrogen thereto. Although liquid nitrogen generally costs more on a per gallon basis than does carbon dioxide liquid, liquid nitrogen (a) is much more easily applied to the freezing plates, (b) provides a greater degree of freezer operation stability, and (c) due to the extremely low plate temperatures achievable using liquid nitrogen, reduces freezer residence time requirements. Moreover, compared to carbon dioxide, substantially less liquid nitrogen is required to achieve a given degree of cooling.

If the coolant used in inventive freezer 2 is carbon dioxide snow, the coolant application system will preferably comprise: at least one $CO_2$ delivery header provided in the interior of upper belt system frame 22; at least one $CO_2$ delivery header provided in the interior of lower belt system frame 126; at least one $CO_2$ delivery nozzle extending from the upper $CO_2$ delivery header such that the nozzle is operable for applying $CO_2$ snow to the second sides 38 of upper freezing plates 32 as plates 32 travel along the bottom of upper belt system 4; and at least one $CO_2$ delivery nozzle extending from the lower $CO_2$ delivery header such that the nozzle is operable for applying $CO_2$ snow to the second sides 38 of lower freezing plates 110 as plates 110 travel along the bottom of lower belt system 6. The $CO_2$ application system will also preferably include one or more rollers rotatably secured in each of the upper and lower belt system frames 22 and 126 such that the rollers operate to compress the $CO_2$ snow against the second sides 38 of freezing plates 32 and 110 as plates 32 and 110 travel along the bottoms of upper and lower belt systems 4 and 6.

Figure 20:
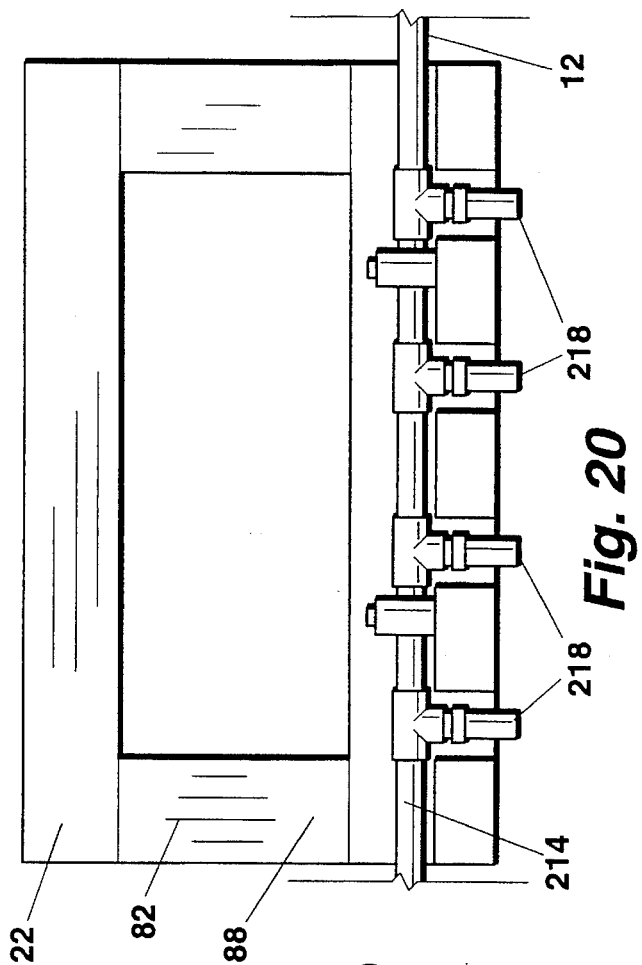
FIG. 20 depicts a first nitrogen delivery header 214 positioned in and connected to the inner portion 82 of upper belt system frame 22.
Figure 21:
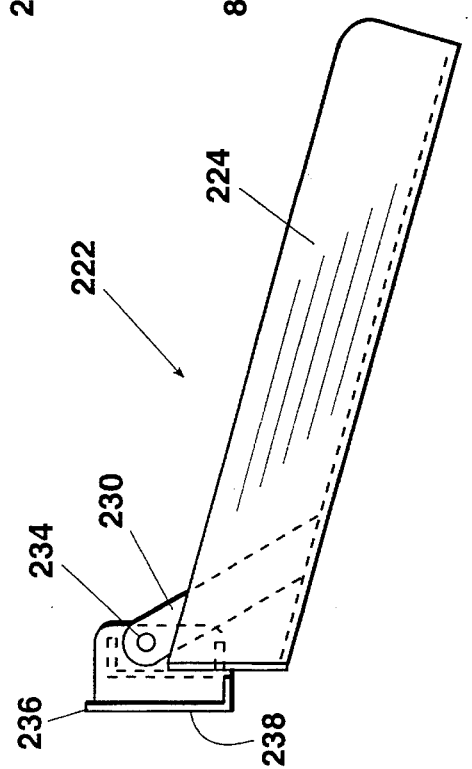
FIG. 21 provides an elevational side view of a product scraper and chute assembly 222 used in inventive freezer 2.
Figure 22:
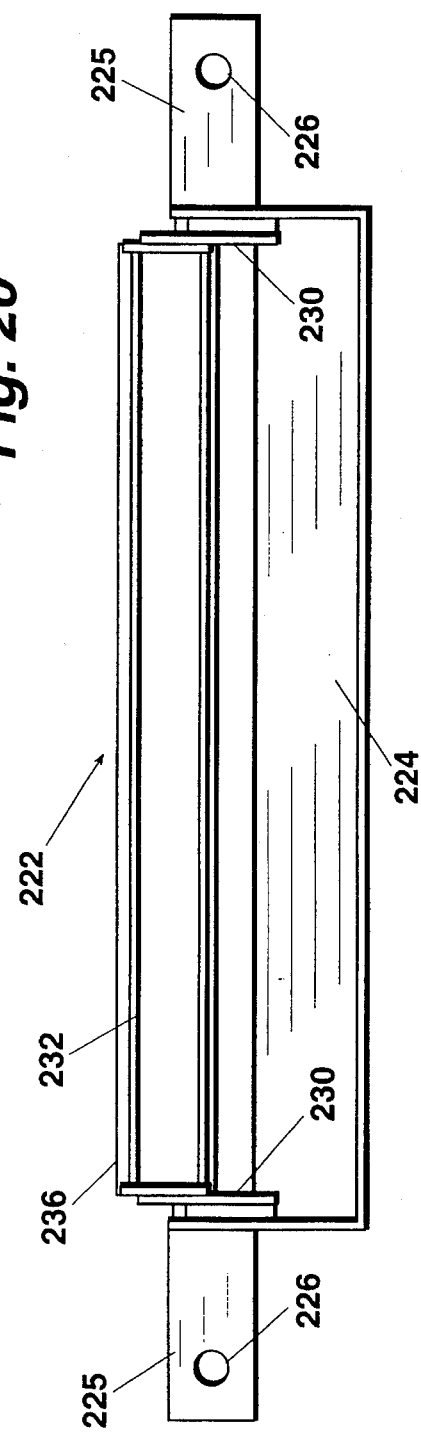
FIG. 22 provides an elevational back view of scraper and chute assembly 222.

A liquid nitrogen delivery system 12 preferred for use in the present invention is depicted in FIGS. 7 and 20. Nitrogen delivery system 12 comprises: a first nitrogen delivery conduit 206 for delivering liquid nitrogen to upper plate belt system 4; a second nitrogen delivery conduit 208 for delivering liquid nitrogen to lower plate belt system 6; a first nitrogen control valve 210 provided in conduit 206 for controlling the amount of liquid nitrogen delivered to upper belt system 4; a second nitrogen control valve 212 provided in conduit 208 for controlling the amount of liquid nitrogen delivered to lower belt system 6; a first nitrogen delivery header 214 connected to conduit 206 and secured in inner portion 82 of upper belt system frame 22 adjacent inlet end idling sprockets 18; a second nitrogen delivery header 216 connected to conduit 208 and secured in the inner portion 128 of lower system frame 126 adjacent outlet end driving sprockets 116; a plurality of (preferably four) standard nitrogen phase separators 218 extending from nitrogen header 214 for delivering liquid nitrogen to the second sides 38 of upper freezing plates 32 as plates 32 travel across the bottom of upper belt system 4; and a plurality of (preferably four) standard nitrogen phase separators extending from nitrogen delivery header 216 for applying liquid nitrogen to second sides 38 of lower freezing plates 110 as plates 110 travel across the bottom of lower belt system 6.

The phase separators extending downwardly from nitrogen headers 214 and 216 and the recesses 44 provided in plates 32 and 110 are preferably positioned between the upper and lower frame structure belt support strips 102 and 144 such that the liquid nitrogen flowing from headers 214 and 216 is placed directly in recesses 44. Further, at least a portion of first nitrogen delivery conduit 206 is preferably formed from a flexible material (e.g., stainless steel flex pipe) so that nitrogen delivery system 12 will accommodate the raising and lowering of upper plate belt system 4.

Substantially all of the liquid nitrogen placed in recesses 44 of upper freezing plates 32 typically vaporizes prior to the time that plates 32 are contacted by outlet end driving sprockets 20. Additionally, substantially all of the liquid nitrogen placed in recesses 44 of lower freezing plates 110 typically vaporizes before plates 110 are contacted by inlet end idling sprockets 114. The nitrogen vapor formed in inventive freezer 2 flows to the bottom of freezing cabinet 176. Suction ducts will typically be placed beneath the inlet and exit end openings 178 and 180 of freezing cabinet 176 for collecting nitrogen vapor flowing out of openings 178 and 180. As is common in the art, an exhaust fan and ducting system will preferably be associated with the suction ducts for delivering the nitrogen effluent from the inventive freezer to a safe location and discharging the nitrogen effluent to the atmosphere.

Liquid nitrogen delivery system 12 is preferably operated such that, when the contacting surfaces 36 of upper freezing plates 32 and lower freezing plates 110 initially contact articles placed in inventive freezer 2, the temperature of each plate contacting surface 36 is in the range of from about −50° F. to about 180° F. System 12 is most preferably operated such that, when the contacting surfaces 36 of plates 32 and 110 initially contact articles placed in inventive freezer 2, the temperature of each plate contacting surface 36 is in the range of from about −130° F. to about −180° F.

As will be understood by those skilled in the art, thermocouples which contact and ride across the contacting surfaces 36 of freezing plates 32 and 110 can optionally be installed adjacent the inlet end of inventive freezer 2. As will further be understood by those skilled in the art, standard instrumentation can be associated with these thermocouples to automatically operate nitrogen control valves 210 and 212 such that the amount of nitrogen being applied to plates 32 and 110 is adjusted to achieve a preselected plate temperature objective.

Most of the chicken breast fillets or other articles frozen in inventive freezer 2 will not stick to either upper freezing plates 32 or lower freezing plates 110. Thus, the frozen articles will simply fall off of lower freezing plates 110 as lower plate belt 108 curves downward on outlet end driving sprockets 116.

In order to ensure that all of the articles frozen in inventive freezer 2 are removed from plates 110, a scraper and chute assembly 222 is preferably provided at the exit end of inventive freezer 2. Assembly 222 preferably comprises: a downwardly sloping product chute 224 which extends across cabinet exit opening 180; two attaching members 225 extending outwardly from product chute 224 and having apertures 226 provided therein for bolting chute 224 to the exterior wall of freezer cabinet 176; a pair of blade support arms 230 extending upwardly from the sides of chute 224; an elongate blade support structure 232 which is pivotably secured by means of pins 234 between the upper ends of support arms 230; and a blade 236 which extends across blade support structure 232 and has a flat surface 238. Flat surface 238 rides on the contacting surfaces 36 of plates 110 as lower plate belt 108 curves downwardly on driving sprockets 116. Most preferably, springs are provided on the scraper assembly attachment bolts between attaching members 225 and the exterior wall of freezer cabinet 176. Such spring-loaded attachment of scraper and chute assembly 222 allows assembly 222 to move inwardly and outwardly, as necessary, to account for belt system expansion or shrinkage and to accommodate the turning movement of flat plates 110 on driving sprockets 116.

A similar scraper assembly can also be provided for scraping upper freezing plates 32 whereby any articles which stick to plates 32 as plate belt 16 curves upward on driving sprockets 20 will be removed from plates 32 and will fall downwardly onto lower plate belt 108. The upper scraper assembly will preferably include a blade support structure which is substantially identical to elongate blade support structure 232. Additionally, the upper scraper assembly will preferably include a blade which is substantially identical to blade 236. However, the upper scraper assembly will not include a product chute. Rather, the blade support structure of the upper scraper assembly will preferably be pivotably mounted on or between one or more mounting members which are connected to upper system frame 22. Most preferably, the upper scraper assembly will be spring mounted in substantially the same manner as lower scraper assembly 222 so that the upper scraper assembly will be allowed to move inwardly and outwardly as it rides on the contacting surfaces of upper freezing plates 32.

Inventive freezer system 2 also preferably includes a pair of plate belt guides 242 attached to either the outer portion 84 of upper belt system frame 222 or the outer portion 130 of lower belt system frame 126. The two plate belt guides 242 are preferably positioned in inventive freezer 2 such that a separate guide 242 is located on each side of upper and lower plate belt systems 4 and 6. Each plate belt guide 242 preferably includes an elongate, inwardly projecting, belt contacting strip 244 which operates to separate upper plate belt 16 from lower plate belt 108 by a predetermined distance (e.g., preferably about ⅜ inch for freezing boneless chicken breast fillets). Strips 244 are preferably formed from a low friction material such as ultrahigh molecular weight teflon.

Upper plate belt 16 rides on the top sides of contacting strips 244 as plate belt 16 travels along the bottom of upper belt system 4 from the inlet end to the exit end of inventive freezer 2. Lower plate belt 108, on the other hand, contacts the bottom sides of contacting strips 244 as belt 108 moves along the top of lower belt system 6 from the inlet end to the outlet end of inventive freezer 2.

Boneless chicken breast fillets or other items which are to be frozen in inventive freezer 2 are preferably continuously delivered to freezer 2 by means of in-feed conveyor system 196. As depicted in FIG. 4A, in-feed conveyor system 196 is preferably a standard, retractable needle-nose-type conveyor system. In-feed conveyor system 196 preferably includes a conveyor belt 252 having product placement zones 254 clearly marked thereon. Zones 254 delineate where individual articles or rows of articles must be placed on belt 252 such that the articles will be properly delivered to inventive freezer 2. Moreover, in-feed conveyor 196 is preferably synchronously operated with upper plate belt 16 and lower plate belt 108 such that (a) the articles delivered by in-feed conveyor system 196 are placed squarely on the contacting surfaces 36 of lower freezing plates 110 and (b) the contacting surfaces 36 of upper freezing plates 32 squarely contact and compress the articles against the contacting surfaces 36 of lower plates 110 whereby (c) the resulting compressed articles do not extend over any of the edges of the contacting surfaces 36 of upper freezing plates 32 and lower freezing plates 110.

As indicated above, in-feed conveyor system 196 is preferably a standard, retractable needle-nose-type conveyor assembly. Thus, as will be readily understood by those skilled in the art, in-feed conveyor system 196 preferably comprises: a stationary frame 256 including a stationary table-top portion 258; a needle-nosed tray 260 which is retractably mounted on stationary table top 258; hydraulic cylinders or other means 262 connected between needle-nosed tray 260 and table top 258 for use in selectively retracting and extending needle-nosed tray 260; an idling roller 263 which is rotatably connected to and moves with tray 260 such that roller 263 operates to maintain in-feed conveyor belt 252 in tightened condition when tray 260 is retracted; idling rollers 264 and 266 which are rotatably mounted on frame 256 and are engaged by in-feed conveyor belt 252 such that rollers 264 and 266 assist the travel of belt 252 around table top 258 and around retractable tray 260; and a driving sprocket 268 which engages in-feed conveyor belt 252 and is operable for driving conveyor belt 252 in a synchronous relationship with upper plate belt 16 and lower plate belt 108.

Although generally any type of conveyor belt can be used, conveyor belt 252 is preferably an open, multiple chain link-type belt such as the Series 1100 polyethylene INTERLOX belt available from Interlox Belt Co. Moreover, as is commonly used in the art, driving sprocket 268 will preferably be a specially adapted sprocket which extends across the width of conveyor belt 252 and includes projections which mate with the open, multiple chain-type pattern formed in belt 252. Sprockets specifically designed for driving the Series 1100 INTERLOX belt, for example, are available from Interlox Belt Co.

As also depicted in FIG. 4A, the system for driving in-feed conveyor system 196 in synchronous relationship with upper plate belt 16 and lower plate belt 108 preferably comprises: a first driving chain sprocket 270 provided on inlet end sprocket shaft 118 of inventive freezer 2; a second driving chain sprocket 272 connected to the belt driving sprocket 268 of in-feed conveyor system 196; and a driving chain 274 which is operably positioned on chain sprockets 270 and 272.

In a preferred embodiment of the method of the present invention, items 276 which are to be frozen in the inventive freezer system are delivered to in-feed conveyor system 196 by a standard conveyor 278 or by other transporting means commonly used in the art. Items 276 will typically be boneless chicken, beef, or pork products or other boneless meat products. The inventive freezing system is particularly well-suited for compressing and freezing boneless chicken breast products. Chicken products frozen using the inventive system can be cooked or uncooked and can be either marinaded (e.g., vacuum marinaded) or nonmarinaded. Further, chicken products frozen using the inventive system can be skinless or can have skin on the exterior thereof.

Figure 23:
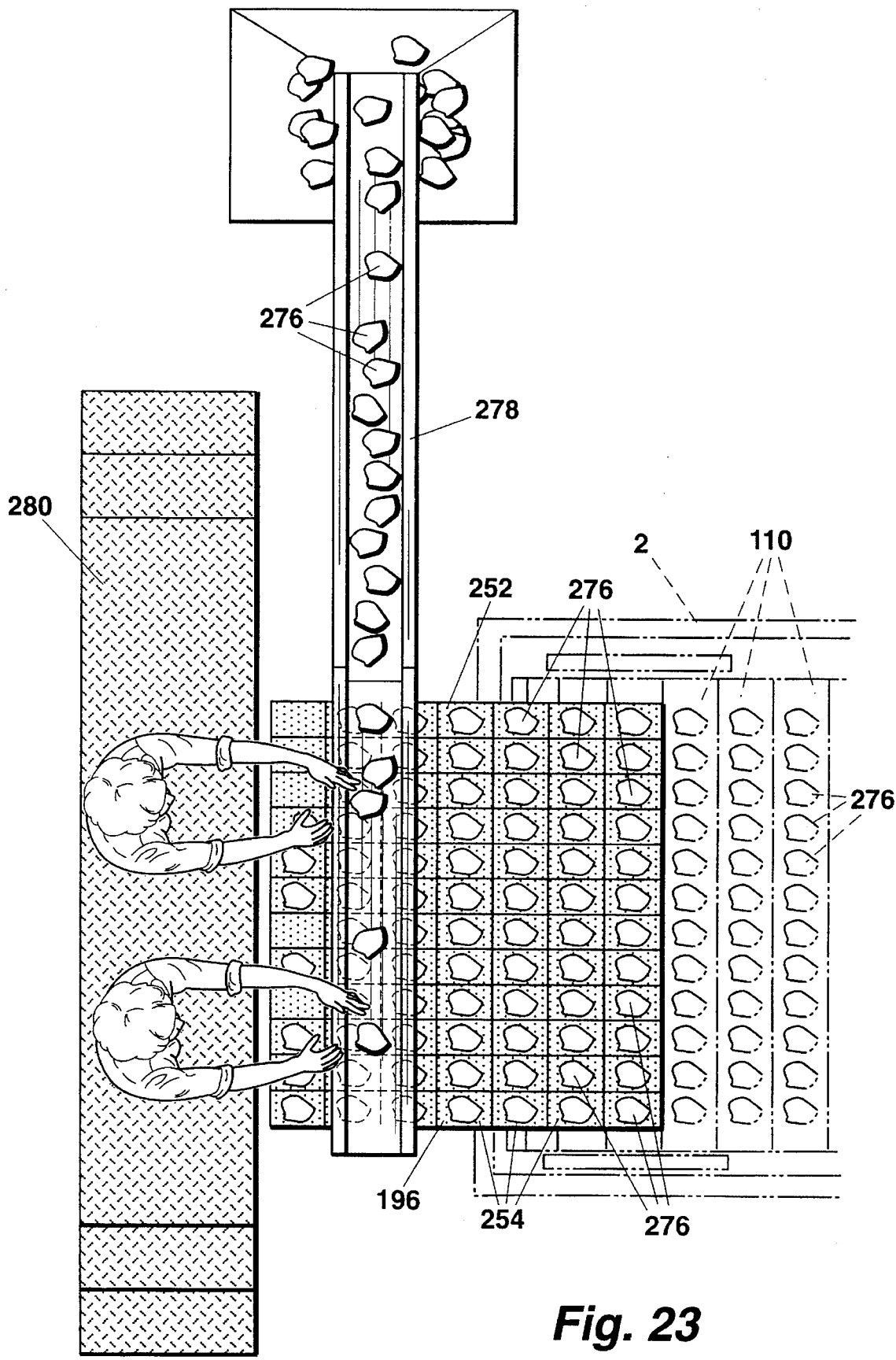
FIG. 23 provides a top view of in-feed conveyor system 196 associated with inventive freezer 2.

Items 276 will typically be transferred from conveyors 278 to in-feed conveyor system 196 by hand. As shown in FIG. 23, a platform 280 can be provided adjacent in-feed conveyor 196, as necessary, for workers to stand on while manually transferring items 276. Items 276 will preferably be arranged in rows within in-feed belt product placement zones 254 whereby in-feed belt 252 will properly deposit items 276 on the contacting surfaces 36 of lower belt freezing plates 110.

The synchronized operation of lower plate belt 108, upper plate belt 16, and in-feed conveyor belt 252 is preferably such that (a) in-feed conveyor belt 252 continuously deposits individual items 276 or rows of items 276 on the contacting surfaces 36 of lower freezing plates 110, (b) after items 276 are deposited on lower freezing plates 110, items 276 are contacted by surfaces 36 of upper freezing plates 32 such that upper freezing plates 32 compress and hold items 276 against surfaces 36 of lower freezing plates 110, (c) items 276 are conveyed in compressed position between upper plates 32 and lower plates 110 from the inlet end of freezer 2 to the outlet end thereof, (d) near the outlet end of inventive freezer 2, upper plate belt 16 turns upward on outlet end driving sprockets 20 such that upper freezing plates 32 move out of contact with items 276 or, if items 276 stick to upper freezing plates 32, items 276 are knocked onto lower freezing belt 108 by an upper belt scraper of the type described hereinabove, (e) after upper belt 16 turns upward, lower plate belt 108 continues to convey items 276 toward the outlet end opening 180 of inventive freezer 2, and (f) as lower plate belt 108 curves downward at the outlet end of inventive freezer 2 on lower driving sprockets 116, items 276 fall or are scraped off of lower freezing plates 110 onto product chute 224.

When used for freezing boneless chicken breast fillets, the upper plate belt 16 of inventive freezer 2 will preferably be positioned above lower plate belt 108 by a distance such that the boneless breast fillets are compressed to a thickness in the range of from about 0.25 to about 0.5 inch. The chicken breast fillets will most preferably be compressed to a thickness of about ⅜ inch.

Figure 24:
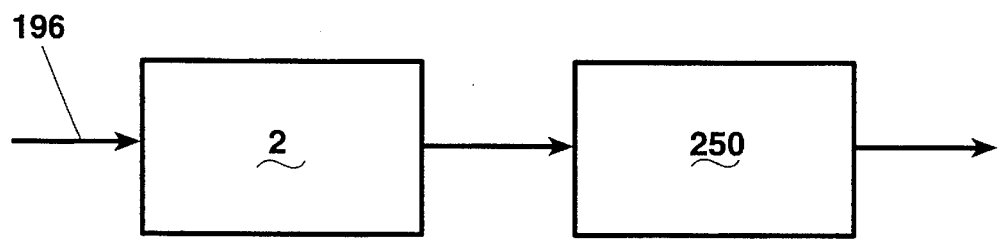
FIG. 24 is a schematic depiction of a method provided by the present invention wherein items are (a) conveyed to inventive freezer 2 by means of in-feed conveyor system 196, (b) partially frozen in inventive freezer 2, and then (c) fully frozen in a second freezer (e.g., a mechanical freezer) 250.
Figure 18:
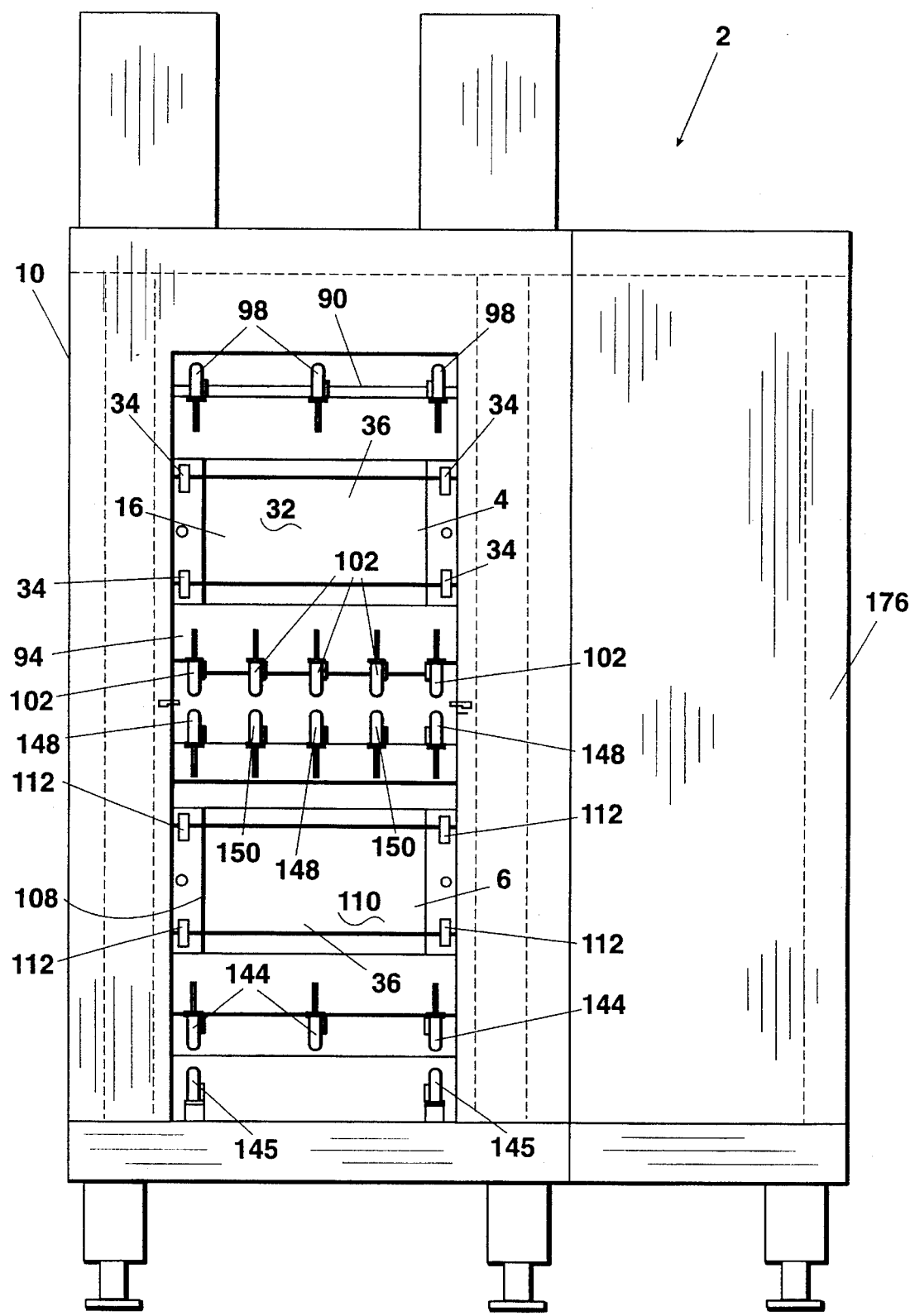
FIG. 18 provides a cutaway elevational inlet end view of inventive freezer 2.
Figure 19:
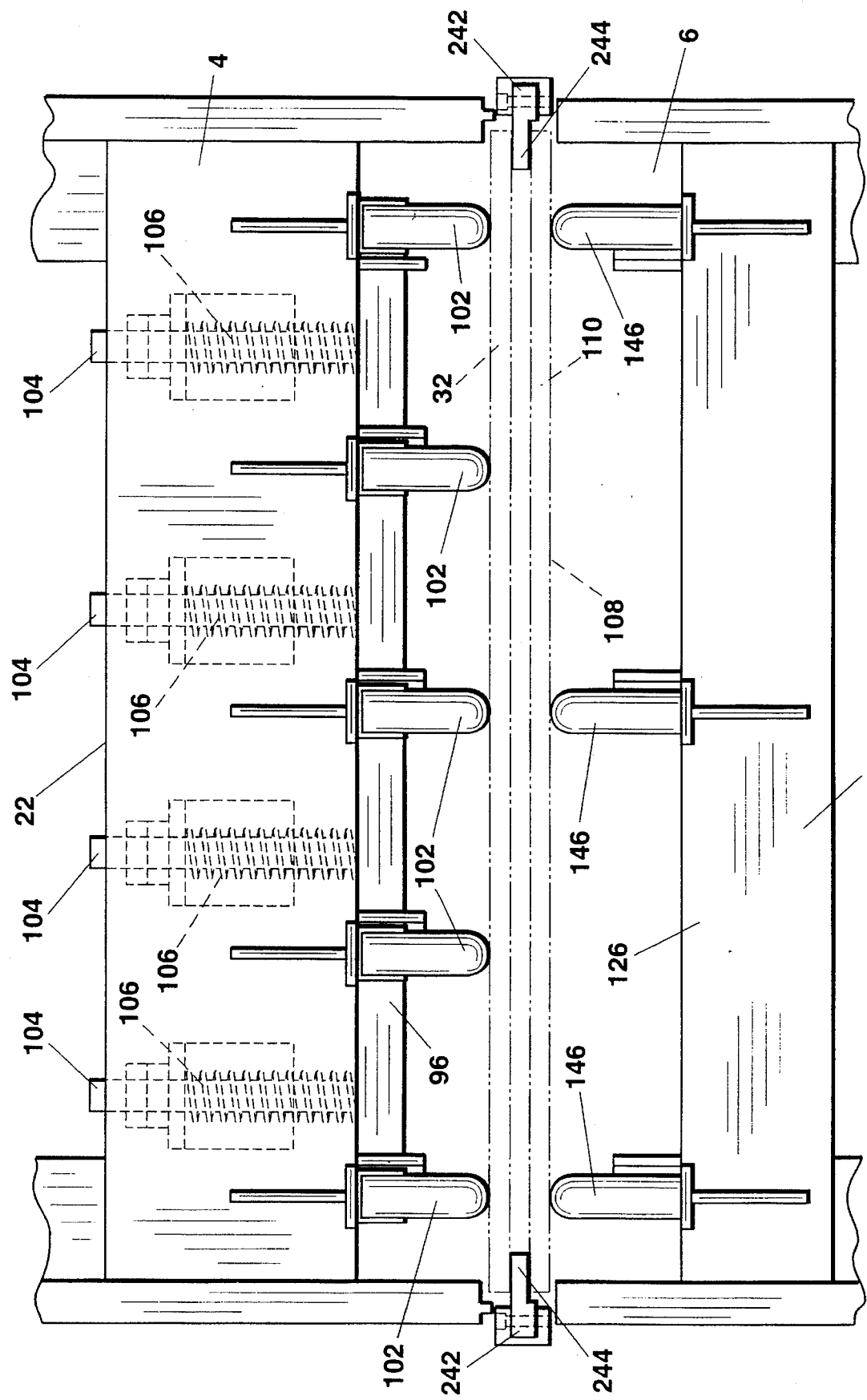
FIG. 19 provides a cutaway elevational outlet end view of inventive freezer 2 showing the lower inner portion of upper frame 22 and the upper inner portion of lower frame 126.

Another embodiment of the inventive method is depicted in FIG. 24. In this embodiment, items 276 are partially frozen in inventive freezer 2 and are then fully frozen in a standard mechanical-type freezer 250 (e.g., a spiral-type mechanical freezer which utilizes an ammonia coolant).

Regardless of whether items 276 are fully frozen or are only partially frozen in inventive freezer 2, the inventive method produces a highly uniform product which will not substantially spring back to its original thickness profile when thawed. Additionally, when the extremely cold contacting surfaces 36 of plates 32 and 110 contact items 276, the exterior surfaces of items 276 are instantaneously frozen in a manner such that, throughout the remainder of the particular freezing process chosen, marinade seepage and moisture loss are substantially completely prevented.

Figure 25:
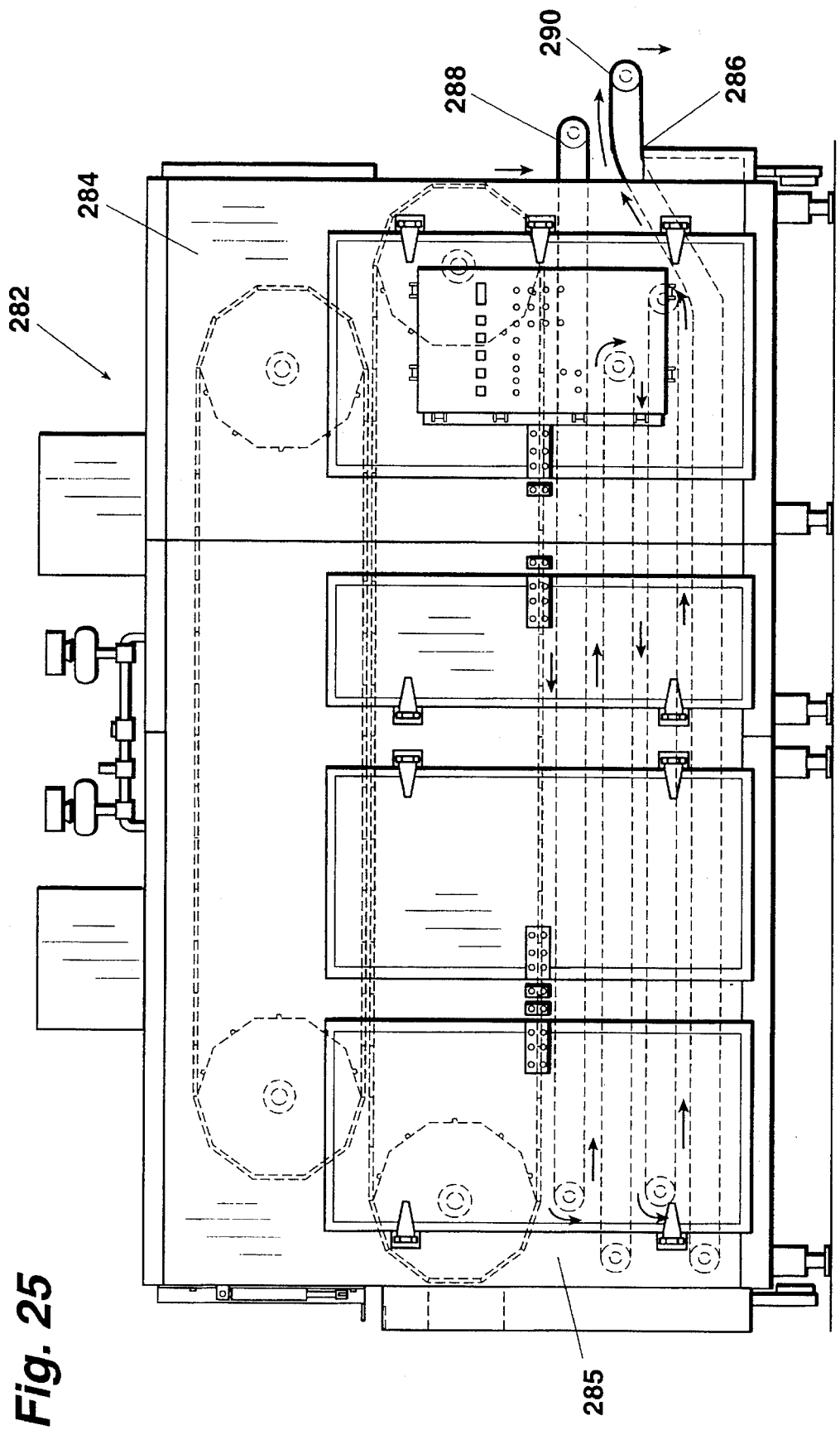
FIG. 25 provides a front elevational view of a second embodiment 282 of the dual contact, continuous, compression-type freezer provided by the present invention.

An alternative embodiment 282 of the inventive freezer is depicted in FIG. 25. Inventive freezer 282 is substantially identical to inventive freezer 10 except that (a) inventive freezer 282 has a deeper cabinet 284 such that a gap 285 is provided between the floor of cabinet 284 and the bottom of lower plate belt system 6 and (b) a conveyor system 286 is provided in gap 285. As indicated above, the nitrogen coolant applied to upper belt 16 and to lower belt 108 vaporizes and flows to the bottom of the freezer cabinet. Inventive freezer 282 uses the cold material collected in the bottom of cabinet 284 to provide additional cooling for the at least partially frozen, compressed items produced by upper and lower plate belts 16 and 108. Specifically, as indicated in FIG. 25, the at least partially frozen items falling off of lower belt 108 are deposited on conveyor system 286 at location 288 and are then conducted by conveyor 286 through the bottom of freezer cabinet 284 to an outlet location 290.

The following examples are provided in order to further illustrate the present invention.

EXAMPLE 1

Two stainless steel plates, each having a flat contacting surface, were secured in a press such that the plate contacting surfaces were directly opposed to each other. The plates were then cooled to −80° F. by applying carbon dioxide snow to the plate contacting surfaces.

Next, uncooked, warm (45° F.) vacuum marinaded chicken breast fillets were weighed and then compressed between the chilled plates to a thickness of ⅜ inch. A compression time of about two minutes was required to completely freeze the marinaded product such that the average temperature of the product was 0° F. Following the two minute compression/freezing period, the resulting frozen product was removed from between the plates and reweighed.

For comparison purposes, identically prepared, uncooked, warm, vacuum marinaded chicken breast fillets were weighed and then frozen in a prior art freezing system. The prior art freezing system consisted of a roller-type press positioned upstream of a spiral-type mechanical freezer. The mechanical freezer was operated using an ammonia coolant.

The results obtained using the inventive plate system versus the prior art system are presented in Table I. As shown in Table I, the inventive plate system virtually eliminated product breakage problems and provided substantially superior marinade and moisture retention results.

TABLE I

PLATE SYSTEM V. PRIOR ART SYSTEM UTILIZING ROLLER-TYPE PRESS

|  | PRIOR ART SYSTEM | PLATE SYSTEM |
| --- | --- | --- |
| Final Weight (Frozen Marinaded Product) | 104 lbs* | 104 lbs |
| Weight Amount of Warm Chicken Product (Unmarinaded) Required to Achieve Frozen, Marinaded Product Weight | 97 lbs | 88.4 lbs |
| Increased Marinade and Moisture Retention Per 100 lbs of Product Provided by Inventive Plate System | — | 8.6 lbs |

*Approximately four pounds of final product produced by the prior art system constituted broken pieces. In contrast, substantially no product breakage occurred when using the plate freezing system.

In further contrast to the results obtained using the prior art system, the inventive plate freezer system provided a frozen product which had a much more uniform thickness profile and was substantially free of surface impressions and cracks.

EXAMPLE 2

Two ½ inch thick stainless steel plates, each having a contacting surface area of 144 square inches, were placed in a mechanical press. The plates were then cooled to −65° F. by applying carbon dioxide snow to the plate contacting surfaces.

Next, a warm, boneless chicken breast fillet having skin on the exterior thereof was compressed to a thickness of ⅜ inch between the plate contacting surfaces for a period of 25 seconds. At the end of the 25 second period, the product was removed from the stainless steel plates. The partially frozen product was then completely frozen in a cabinet freezer set at −80° F. The product was conveyed through the cabinet freezer by means of a standard wire mesh freezer belt.

After only 25 seconds of compressive contact, the skin and exterior portion of the product were sufficiently set/frozen to allow the product to be easily removed from the plate contacting surfaces. Moreover, the uniform thickness of ⅜ inch imparted to the product in the plate compression step was maintained throughout the freezing process. Additionally, no impressions were left on the product surface by the cabinet freezer conveyor belt.

The combination plate freezing/cabinet freezing system used in this example also provided excellent moisture retention results. The initial weight of the warm product in this case was 105 grams. Following the plate freezing process and prior to being placed in the cabinet freezer, the weight of the chilled product was still 105 grams. After 15 minutes residence time in the cabinet freezer, the weight of the final frozen product was 104.5 grams.

EXAMPLE 3

In this test, a boneless chicken breast fillet having skin on the exterior thereof was frozen using the same equipment and substantially the same procedure used in Example 2. However, in this test, the temperature of the plates at the beginning of the compression stage was −80° F. and the duration of the compression stage was only 20 seconds. Prior to the plate compression step, the chicken fillet product weighed 117.5 grams and the average temperature of the product was 35° F. Following the plate compression step, the product still weighed 117.5 grams and was easily removed from the stainless steel plates. After the cabinet freezing step, the frozen product weighed 117 grams and had an average temperature of 15° F. Moreover, the frozen product had a highly uniform thickness of ⅜ inch and was free of belt impressions, cracks, and other surface imperfections.

EXAMPLE 4

In this test, a boneless chicken fillet having skin on the exterior thereof was frozen using the same equipment and substantially the same procedure as used in Examples 2 and 3. However, in this test, the temperature of the plates at the beginning of the compression stage was −80° F. and the duration of the compression stage was only 15 seconds.

Prior to the compression stage, the average temperature of the warm product was 35° F. and the warm product weighed 119 grams. The product still weighed 119 grams after the compression stage and weighed 118.5 grams after the cabinet freezing stage. At the end of the cabinet freezing stage, the average temperature of the frozen product was 11° F.

The fully frozen product produced in this test had a highly uniform thickness profile of ⅜ inch. Further, the frozen product was free of belt impressions, cracks, and other surface imperfections.

EXAMPLE 5

Two stainless steel plates, each having a contact surface area of 144 square inches, were placed in a press and chilled using carbon dioxide snow to a temperature of −88° F. Four boneless chicken breast fillets were then simultaneously compressed between the plates to a thickness of ⅜ inch for a period of two minutes. Prior to being placed between the freezing plates, the four chicken breast fillets had a combined total weight of 457.5 grams and an average temperature of 43° F. After the two minute compression period, the frozen breast fillets were immediately removed from the freezing plates.

After freezing, the average temperature of the frozen breast fillets was 18° F. The total weight of the frozen breast fillets remained at 457.5 grams.

Immediately following the freezing period, the temperature of each of the plate contacting surfaces was about −42° F. After removing the frozen breast fillets therefrom, 683 grams of carbon dioxide snow was placed between the plates. This mass of $CO_2$ snow was compressed between the plates at a pressure of 750 psi. With carbon dioxide snow applied to the contacting surfaces of the plates in this manner, the temperature of the contacting surfaces reached −88° F. in one minute forty seconds. At the end of this chilling period, 367 grams of carbon dioxide snow remained.

EXAMPLE 6

Four boneless chicken breast fillets having a combined total weight of 449.5 grams and an average temperature of 43° F. were frozen in the same manner as indicated in Example 5. The initial contacting surface temperature in this case was −88° F. After the boneless breast fillets were compressed between the freezing plates for a period of two minutes, the temperature of each of the plate contacting surfaces was about −64° F. The average temperature of the resulting frozen breast fillets was 17° F. The total weight of the frozen product was 449.5 grams.

After removing the frozen product from between the freezing plates, the freezing plate contacting surfaces were recharged to a temperature of −88° F. in one minute forty seconds by compressing carbon dioxide snow between the plates. 221 grams of carbon dioxide snow were consumed in this recharging step. Assuming 2.5 pounds of liquid $CO_2$ are required to produce 1 pound of $CO_2$ snow, the amount of carbon dioxide liquid required for recharging the freezing plates was 1.21 pounds per pound of product.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A method of freezing an individual, unpackaged, chicken breast fillet having a nonuniform original thickness profile, said method comprising the step of compressing said chicken breast fillet between a cooled first contacting surface and a cooled second contacting surface for a time effective for at least partially freezing said chicken breast fillet such that an at least partially frozen chicken breast fillet product is formed which has a substantially uniform thickness profile and does not substantially return to said nonuniform original thickness profile when thawed.

2. The method of claim 1 further comprising the step of cooling said contacting surfaces such that the temperature of said first contacting surface is below the freezing temperature of said chicken breast fillet and the temperature of said second contacting surface is below the freezing temperature of said chicken breast fillet.

3. The method of claim 2 wherein:

in said step of cooling, said first contacting surface is cooled to a temperature in the range of from about −50° F. to about −180° F. and in said step of cooling, said second contacting surface is cooled to a temperature in the range of from about −50° F. to about −180° F.

4. The method of claim 1 wherein each of said contacting surfaces is an anodized aluminum surface.

5. The method of claim 1 wherein said chicken breast fillet is partially frozen in said step of compressing and said method further comprises the step, following said step of compressing, of fully freezing said product in a second freezer.

6. The method of claim 1 wherein said at least partially frozen chicken breast fillet product has a substantially uniform thickness in the range of from about 0.25 to about 0.5 inches.

7. The method of claim 1 wherein:

said first contacting surface is included in a first continuously rotating belt;

said second contacting surface is included in a second continuously rotating belt; and said method further comprises the step of positioning said chicken breast fillet between said rotating belts such that said chicken breast fillet is compressed and temporarily held between said contacting surfaces in accordance with said step of compressing.

8. The method of claim 1 wherein:

said first contacting surface is provided on a first plate;

said second contacting surface is provided on a second plate;

said first plate comprises a second side opposite said first contacting surface;

said method further comprises the step of cooling said first contacting surface to a temperature below the freezing temperature of said chicken breast fillet by directly applying a coolant to said second side of said first plate;

said second plate comprises a second side opposite said second contacting surface; and said method further comprises the step of cooling said second contacting surface to a temperature below the freezing temperature of said chicken breast fillet by directly applying a coolant to said second side of said second plate.

9. The method of claim 8 wherein:

said second side of said first plate has a first plate recess formed therein;

said first contacting surface is cooled in said step of cooling said first contacting surface by placing liquid nitrogen in said first plate recess;

said second side of said second plate has a second plate recess formed therein; and said second contacting surface is cooled in said step of cooling said second contacting surface by placing liquid nitrogen in said second plate recess.

10. A product produced by a method comprising the step of compressing an individual, unpackaged, chicken breast fillet having a nonuniform original thickness profile between a cooled first contacting surface and a cooled second contacting surface for a time effective for at least partially freezing said chicken breast fillet such that said at least partially frozen chicken breast fillet has a substantially uniform thickness profile and does not substantially return to said nonuniform original thickness profile when thawed, wherein:

when said cooled first contacting surface initially contacts said chicken breast fillet, the temperature of said cooled first contacting surface is below the freezing temperature of said chicken breast fillet and when said cooled second contacting surface initially contacts said chicken breast fillet, the temperature of said cooled second contacting surface is below the freezing temperature of said chicken breast fillet.

11. The product of claim 10 wherein said chicken breast fillet is compressed between said cooled first and second contacting surfaces for a time effective for fully freezing said chicken breast fillet.

12. The product of claim 10 wherein said chicken breast fillet is compressed between said cooled first and second contacting surfaces for a time effective for partially freezing said chicken breast fillet.

13. The product of claim 12 wherein, following said step of compressing, said partially frozen chicken breast fillet is fully frozen in a mechanical freezer.

14. The product of claim 10 wherein:

when said cooled first contacting surface initially contacts said chicken breast fillet, the temperature of said cooled first contacting surface is in the range of from about −50° F. to about −180° F. and when said cooled second contacting surface initially contacts said chicken breast fillet, the temperature of said cooled second contacting surface is in the range of from about −50° F. to about −180° F.

15. The product of claim 10 wherein each of said contacting surfaces is an anodized aluminum surface.

16. The product of claim 10 wherein said at least partially frozen chicken breast fillet has a substantially uniform thickness in the range of from about 0.25 to about 0.5 inches.

17. A method of freezing a product comprising the step of compressing said product between a cooled first contacting surface and a cooled second contacting surface for a time effective for at last partially freezing said product, wherein:

said first contacting surface is provided on a first plate:

said second contacting surface is provided on a second plate;

said first plate comprises a second side opposite said first contacting surface;

said second plate comprises a second side opposite said second contacting surface;

said second side of said first plate has a first plate recess formed therein;

said second side of said second plate has a second plate recess formed therein;

said method also comprises the step of cooling said first contacting surface to a temperature below the freezing temperature of said product by placing liquid nitrogen in said first plate recess; and said method further comprises the step of cooling said second contacting surface to a temperature below the freezing temperature of said product by placing liquid nitrogen in said second plate recess.

18. A freezing apparatus comprising:

a first contacting surface provided on a first plate, said first plate having a second side opposite said first contacting surface and said second side of said first plate having a first plate recess formed therein;

a second contacting surface provided on a second plate, said second plate having a second side opposite said second contacting surface and said second side of said second plate having a second plate recess formed therein;

a cooling means for cooling said contacting surfaces by placing liquid nitrogen in said recesses; and compressing means for positioning said contacting surfaces adjacent to each other in a manner effective for compressing an article to be frozen between said contacting surfaces.

19. A freezing apparatus comprising:

a housing;

a lower belt positioned in said housing;

an upper belt positioned in said housing, said belts being positionable adjacent to each other and said belts being operable in a synchronized manner such that articles to be frozen will be compressed and temporarily held between said belts;

a cooling means for cooling said belts by applying a coolant to said belts such that, after being applied to said belts, at least a portion of said coolant flows to the bottom portion of said housing;

driving means for driving said belts in said synchronized manner; and conveyor means for conveying compressed and at least partially frozen articles from said belts through said bottom portion of said housing.

20. A freezing apparatus comprising:

a first plate belt comprising a plurality of serially connected first belt freezing plates, said first plate belt being operable for traveling in a first continuous circuit such that, in a portion of said first circuit, said first belt freezing plates travel along a first substantially linear path;

a second plate belt comprising a plurality of serially connected second belt freezing plates, said second plate belt being operable for traveling in a second continuous circuit such that, in a portion of said second circuit, said second belt freezing plates travel along a second substantially linear path, said second substantially linear path being substantially parallel to said first substantially linear path;

each of said first and second belt freezing plates including a contacting surface having a leading edge and a trailing edge;

said first and second plate belts are operable in a synchronous manner such that as each individual said first belt freezing plate travels along at least a portion of said first substantially linear path, a corresponding individual said second belt freezing plate travels along said second substantially linear path in a fixed relative position adjacent to said individual first belt freezing plate; and said fixed relative position is such that, as said individual first belt freezing plate travels along said first substantially linear path, a meat product positioned centrally on said contacting surface of said individual first belt freezing plate between said leading and trailing edges thereof will be compressed and held between said contacting surface of said individual first belt freezing plate and said contacting surface of said individual second belt freezing plate such that said meat product does not extend over any of said leading and trailing edges of said individual first and second belt freezing plates.

21. The freezing apparatus of claim 20 further comprising cooling means for cooling said first belt freezing plates and for cooling said second belt freezing plates.

22. The freezing apparatus of claim 21 wherein said cooling means comprises an application means for applying a coolant to said first belt freezing plates and to said second belt freezing plates.

23. The freezing apparatus of claim 22 wherein said application means is a means for applying liquid nitrogen to said first belt freezing plates and to said second belt freezing plates.

24. The freezing apparatus of claim 22 wherein:

each of said first belt freezing plates and said second belt freezing plates has a second side opposite the contacting surface thereof and the second side of each of said first belt freezing plates and said second belt freezing plates has a recess formed therein for receiving said liquid nitrogen.

25. The freezing apparatus of claim 20 further comprising a placing means, synchronously operable with said first plate belt, for placing articles on said contacting surfaces of said first belt freezing plates such that, as said second belt freezing plates travel along said second substantially linear path, said contacting surfaces of said second belt freezing plates compress and hold said articles against said contacting surfaces of said first belt freezing plates and said articles do not extend over any of said leading and trailing edges of said contacting surfaces of said first and second belt freezing plates.

26. The freezing apparatus of claim 20 wherein:

each of said first belt freezing plates has an aperture provided therein;

each of said second belt freezing plates has an aperture provided therein;

said freezing apparatus further comprises a driving means for synchronously driving said first plate belt in said first continuous circuit and said second plate belt in said second continuous circuit, said driving means comprising a first driving sprocket having a plurality of projecting members which are operable for mating with said apertures provided in said first belt freezing plates such that the rotation of said first driving sprocket drives said first plate belt; and said driving means also comprises a second driving sprocket having a plurality of projecting members which are operable for mating with said apertures provided in said second belt freezing plates such that the rotation of said second driving sprocket drives said second plate belt.

27. The freezing apparatus of claim 26 wherein said projecting members of said first and second driving sprockets are tapered.

28. The freezing apparatus of claim 20 wherein:

said freezing apparatus further comprises a housing;

said plate belts are positioned inside said housing;

said freezing apparatus further comprises an application means for applying a coolant to said first belt freezing plates and to said second belt freezing plates such that, after being applied to said freezing plates, at least a portion of said coolant flows to the bottom portion of said housing; and said freezing apparatus also includes a conveyor means for conveying compressed and at least partially frozen articles from said plate belts through said bottom portion of said housing.

29. A freezing apparatus comprising:

a first plate belt comprising a series of first belt freezing plates, each of said first belt freezing plates having a contacting surface;

a second plate belt comprising a series of second belt freezing plates, each of said second belt freezing plates having a contacting surface;

said plate belts being positionable adjacent to each other and said plate belts being operable in a synchronized manner such that articles placed on said first plate belt will be compressed and temporarily held between the contacting surfaces of corresponding pairs of said first and second belt freezing plates;

said apparatus further comprising driving means for driving said plate belts in said synchronized manner;

each of said first belt freezing plates and said second belt freezing plates having a second side opposite the contacting surface thereof;

the second side of each of said first belt freezing plates and said second belt freezing plates having a recess formed therein; and said apparatus also comprising cooling means for placing liquid nitrogen in said recesses formed in said second sides of said first belt freezing plates and said second belt freezing plates.

30. A freezing apparatus comprising:

a housing;

a first plate belt, positioned inside said housing, comprising a series of first belt freezing plates, each of said first belt freezing plates having a contacting surface;

a second plate belt, positioned inside said housing, comprising a series of second belt freezing plates, each of said second belt freezing plates having a contact surface;

said plate belts being positionable adjacent to each other and said plate belts being operable in a synchronized manner such that articles placed on said first plate belt will be compressed and temporarily held between the contacting surfaces of corresponding pairs of first and second belt freezing plates;

driving means for driving said plate belts in said synchronized manner;

application means for applying a coolant to said freezing plates such that, after being applied to said freezing plates, at least a portion of said coolant flows to the bottom portion of said housing; and conveyor means for conveying compressed and at least partially frozen articles from said plate belts through said bottom portion of said housing.

* * * * *

UNITED STATES PATENT AND TRADEMARK OFFICE
CERTIFICATE OF CORRECTION

PATENT NO. : 5,533,343

DATED : July 9, 1996

INVENTOR(S) : Mark W. Moshier et al.

It is certified that error appears in the above-identified patent and that said Letters Patent is hereby corrected as shown below:

In column 19, line 39, change "last" to --least--.

Signed and Sealed this

Twenty-fourth Day of September, 1996

*Attest:*

BRUCE LEHMAN

*Attesting Officer*    Commissioner of Patents and Trademarks